(12) United States Patent
Kato et al.

(10) Patent No.: US 8,144,568 B2
(45) Date of Patent: Mar. 27, 2012

(54) INFORMATION RECORDING MEDIUM, INFORMATION RECORDING APPARATUS AND METHOD, AND INFORMATION REPRODUCING APPARATUS AND METHOD

(75) Inventors: Masahiro Kato, Saitama (JP); Masayoshi Yoshida, Saitama (JP)

(73) Assignee: Pioneer Corporation, Tokyo (JP)

( * ) Notice: Subject to any disclaimer, the term of this patent is extended or adjusted under 35 U.S.C. 154(b) by 951 days.

(21) Appl. No.: 12/065,321

(22) PCT Filed: Aug. 30, 2006

(86) PCT No.: PCT/JP2006/317060
§ 371 (c)(1),
(2), (4) Date: Jun. 19, 2008

(87) PCT Pub. No.: WO2007/026740
PCT Pub. Date: Mar. 8, 2007

(65) Prior Publication Data
US 2009/0129256 A1    May 21, 2009

(30) Foreign Application Priority Data
Aug. 30, 2005 (JP) .................. 2005-249592

(51) Int. Cl.
*G11B 7/24* (2006.01)
(52) U.S. Cl. .................. 369/275.5; 369/275.4
(58) Field of Classification Search .............. 369/275.1, 369/275.2, 275.3, 275.4, 275.5
See application file for complete search history.

(56) References Cited

U.S. PATENT DOCUMENTS

| | | | |
|---|---|---|---|
| 5,270,877 A | 12/1993 | Fukushima et al. | |
| 5,321,673 A | 6/1994 | Okazaki | |
| 2005/0141351 A1* | 6/2005 | Yamanaka | 369/30.01 |
| 2005/0169137 A1* | 8/2005 | Hirasawa | 369/47.32 |

FOREIGN PATENT DOCUMENTS

| | | |
|---|---|---|
| JP | 4-067471 A | 3/1992 |
| JP | 4-313817 A | 11/1992 |
| JP | 8-161749 A | 6/1996 |
| JP | 9-106546 A | 4/1997 |
| JP | 9-180248 A | 7/1997 |
| JP | 2001-325747 | 11/2001 |
| JP | 2003-059194 | 2/2003 |

OTHER PUBLICATIONS

International Search Report of PCT/JP2006/317060 dated Nov. 14, 2006.

* cited by examiner

*Primary Examiner* — Hoa T Nguyen
*Assistant Examiner* — Andrew Sasinowski
(74) *Attorney, Agent, or Firm* — Young & Thompson

(57) ABSTRACT

An information recording medium (100) is provided with (i) a read only area (ROA1 and the like) whereupon read only information is previously recorded by forming embossed pits; (ii) a data area (102) wherein recording information can be recorded; (iii) a first management area (CDZ) wherein first position information (10) relating to the position of the read only area is previously recorded by forming embossed pits; and (iv-1) a second management area (RMA) wherein second position information (20) can be recorded in addition to the first position information or (iv-2) a second management area wherein second position information can be recorded as substitute for the first position information. The second position information relates to the position of a rewrite prohibited area (RWROA1) wherein rewriting of a part of or the entire recording information is prohibited in the data area.

17 Claims, 20 Drawing Sheets

[FIG.1]
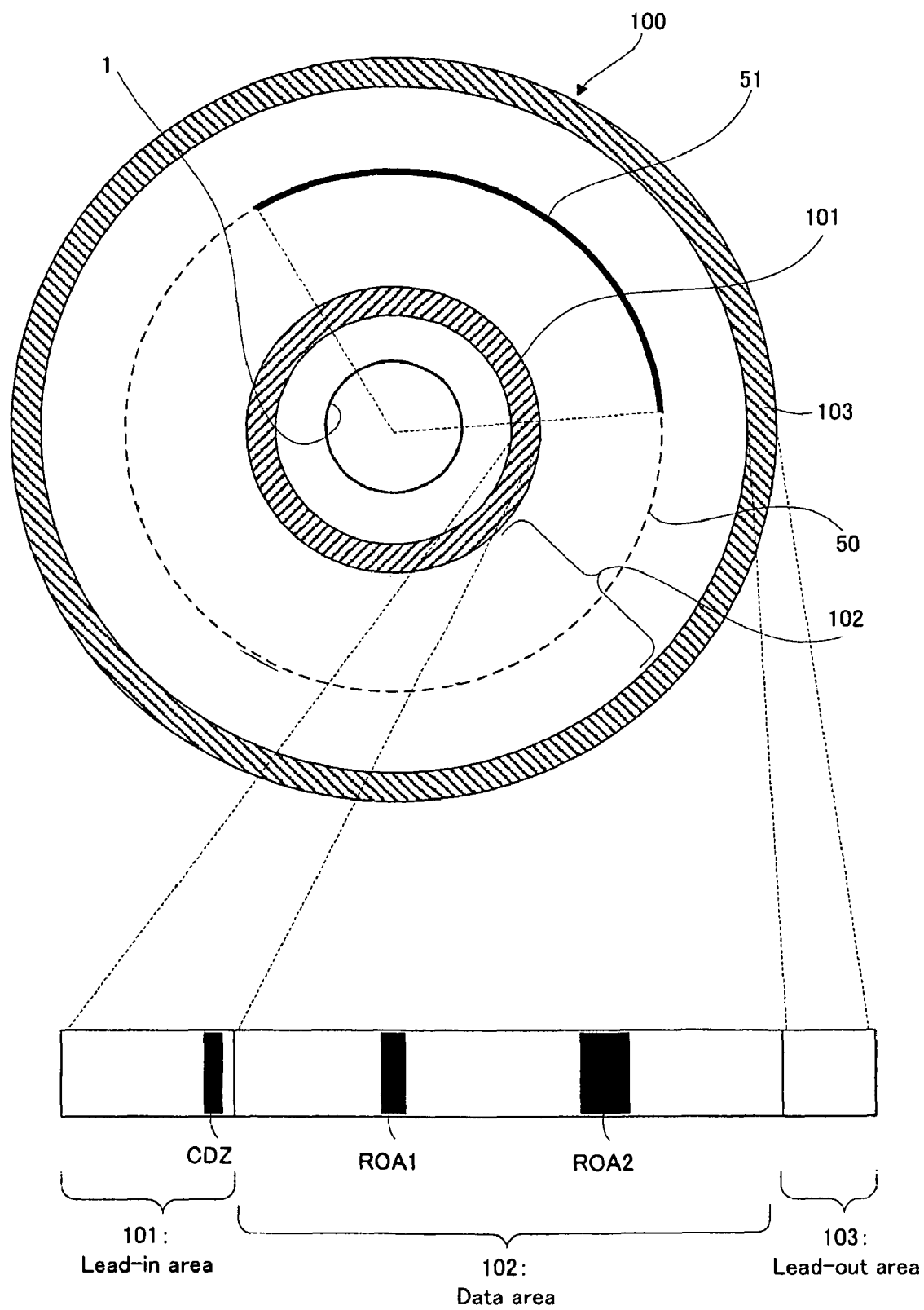

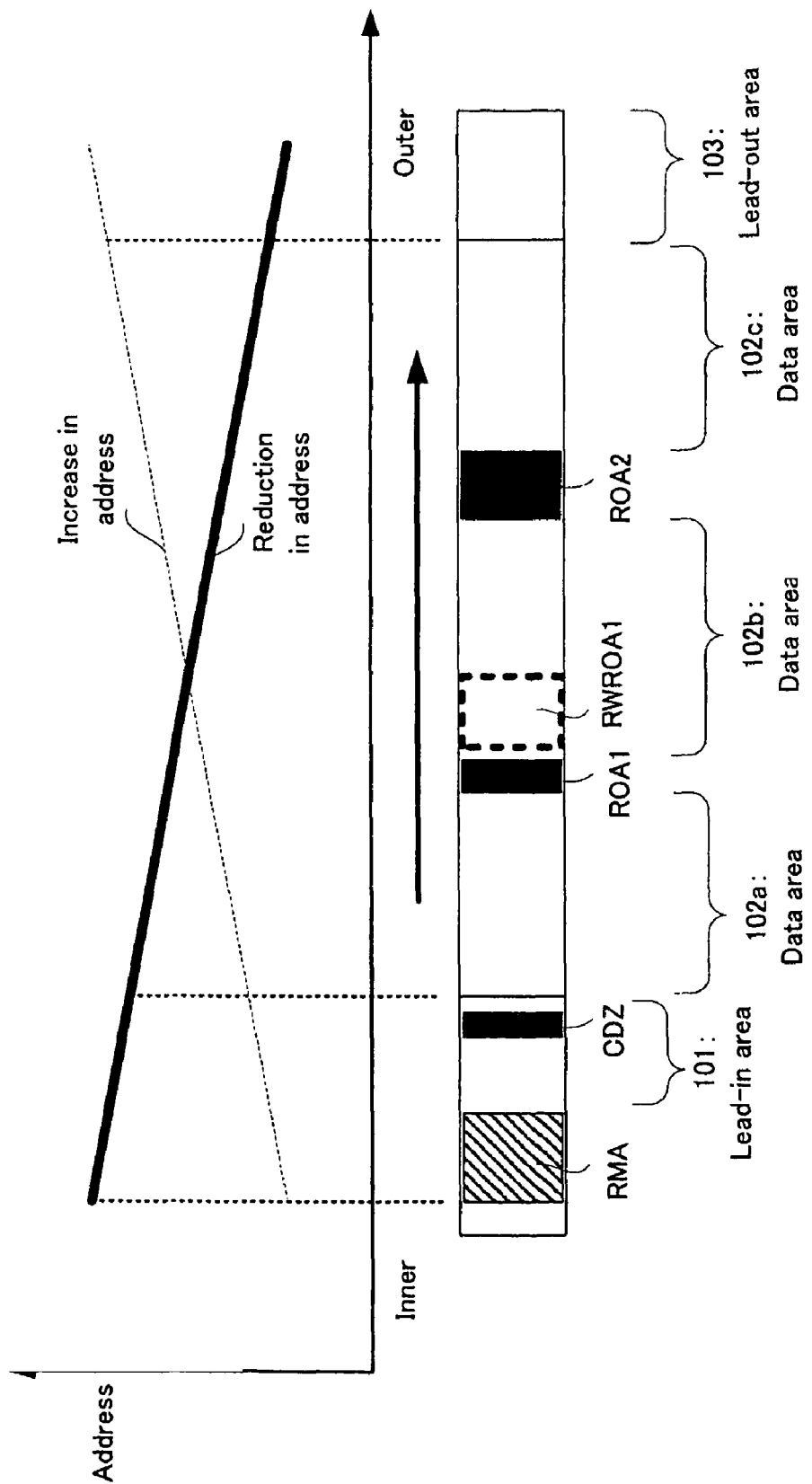
[FIG.2]

[FIG.3]
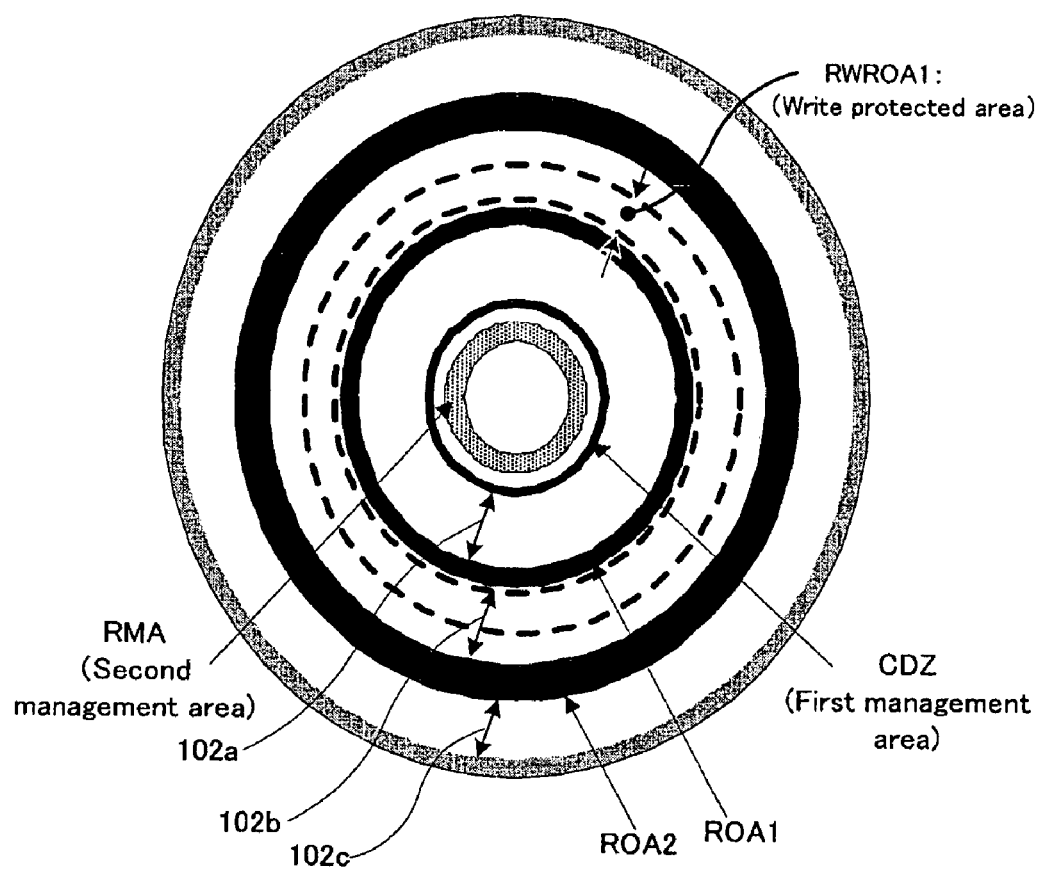

10: First position information (in CDZ)

| Content |
|---|
| Position information indicating ROA1 |
| Position information indicating ROA2 |
| Position information indicating ROA3 |
| Position information indicating ROA4 |
| : |
| Position information indicating ROA「n」 |

(b)

10a: ROA information (in CDZ)

| Data position | Content | Data amount (Bytes) |
|---|---|---|
| 0〜3 | Start address of ROA1 | 4 |
| 4〜7 | End address of ROA1 | 4 |
| 8〜11 | Start address of ROA2 | 4 |
| 12〜15 | End address of ROA2 | 4 |
| 16〜19 | Start address of ROA3 | 4 |
| 20〜23 | End address of ROA3 | 4 |
| 24〜27 | Start address of ROA4 | 4 |
| 28〜31 | End address of ROA4 | 4 |
| : | : | : |
| 2040〜2043 | Start address of ROA256 | 4 |
| 2044〜2047 | End address of ROA256 | 4 |

[FIG.5]

(a) 20: Second position information (in RMA)

| Content |
|---|
| Position information indicating ROA1 |
| Position information indicating RWROA1 |
| Position information indicating ROA2 |
| Position information indicating RWROA2 |
| ⋮ |
| Position information indicating ROA⌈m⌋ |

(b) 20a: ROA information (in RMA)

| Data position | Content | Data amount (Bytes) |
|---|---|---|
| 0~3 | Start address of ROA1 | 4 |
| 4~7 | End address of ROA1 | 4 |
| 8~11 | Start address of RWROA1 | 4 |
| 12~15 | End address of RWROA1 | 4 |
| 16~19 | Start address of ROA2 | 4 |
| 20~23 | End address of ROA2 | 4 |
| 24~27 | Start address of RWROA2 | 4 |
| 28~31 | End address of RWROA2 | 4 |
| ⋮ | ⋮ | ⋮ |
| 2040~2043 | Start address of ROA254 | 4 |
| 2044~2047 | End address of ROA254 | 4 |

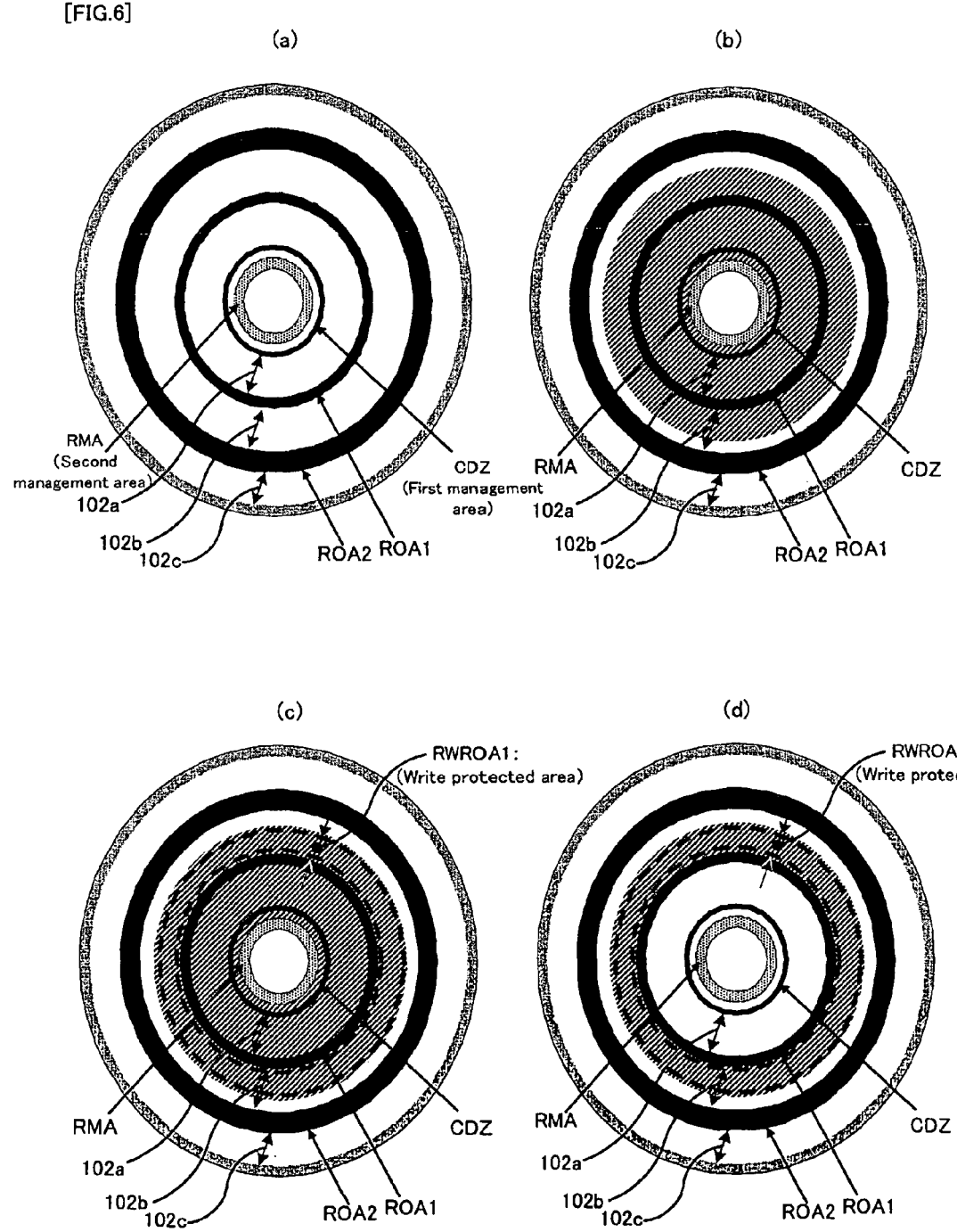

[FIG.7]

Corresponding to ROA1
Corresponding to ROA2

10a: ROA information (in CDZ)

| Data position | Content | Data amount (Bytes) |
|---|---|---|
| 0~3 | 00FF 598C h | 4 |
| 4~7 | 00FF 4C97 h | 4 |
| 8~11 | 00FE C78A h | 4 |
| 12~15 | 00FE A5F5 h | 4 |
| 16~19 | 0000 0000 h | 4 |
| 20~23 | 0000 0000 h | 4 |
| 24~27 | 0000 0000 h | 4 |
| 28~31 | 0000 0000 h | 4 |
| : | : | : |
| 2040~2043 | 0000 0000 h | 4 |
| 2044~2047 | 0000 0000 h | 4 |

[FIG.8]

Corresponding to ROA1
Corresponding to ROA2
Corresponding to RWROA1
20a : ROA information (in RMA)

| Data position | Content | Data amount (Bytes) |
|---|---|---|
| 0~3 | 00FF 598C h | 4 |
| 4~7 | 00FF 4C97 h | 4 |
| 8~11 | 00FF 4C96 h | 4 |
| 12~15 | 00FF 151B h | 4 |
| 16~19 | 00FE C78A h | 4 |
| 20~23 | 00FE A5F5 h | 4 |
| 24~27 | 0000 0000 h | 4 |
| 28~31 | 0000 0000 h | 4 |
| ⋮ | ⋮ | ⋮ |
| 2040~2043 | 0000 0000 h | 4 |
| 2044~2047 | 0000 0000 h | 4 |

[FIG.9]
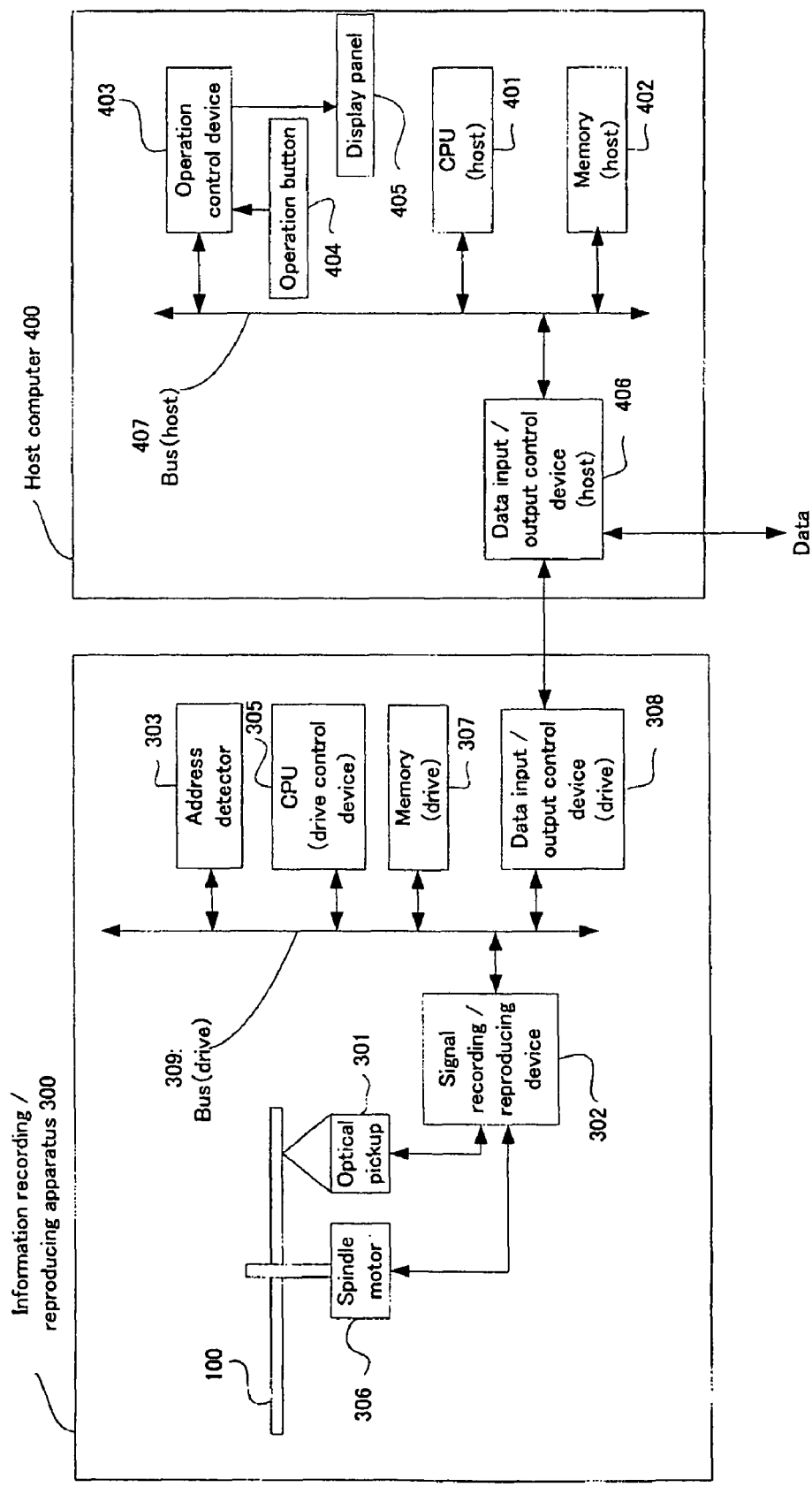

[FIG.10]
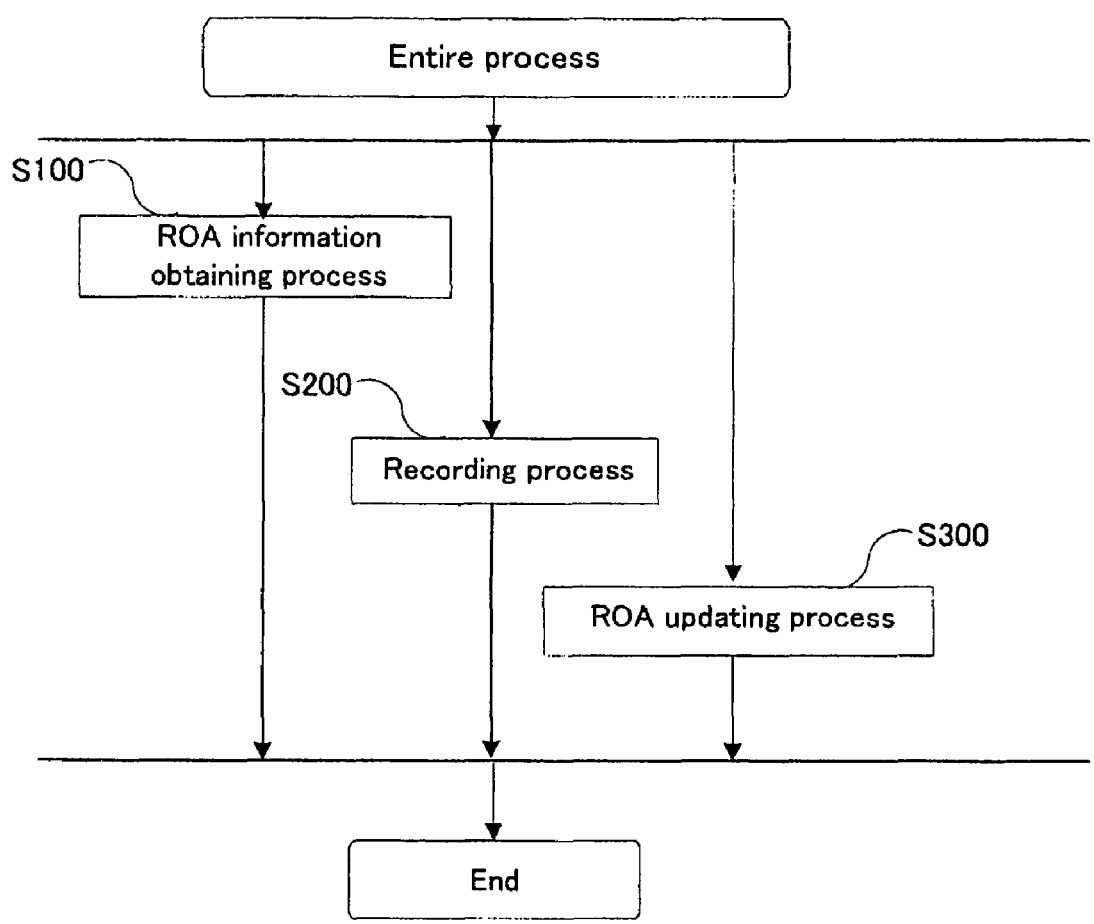

[FIG.11]
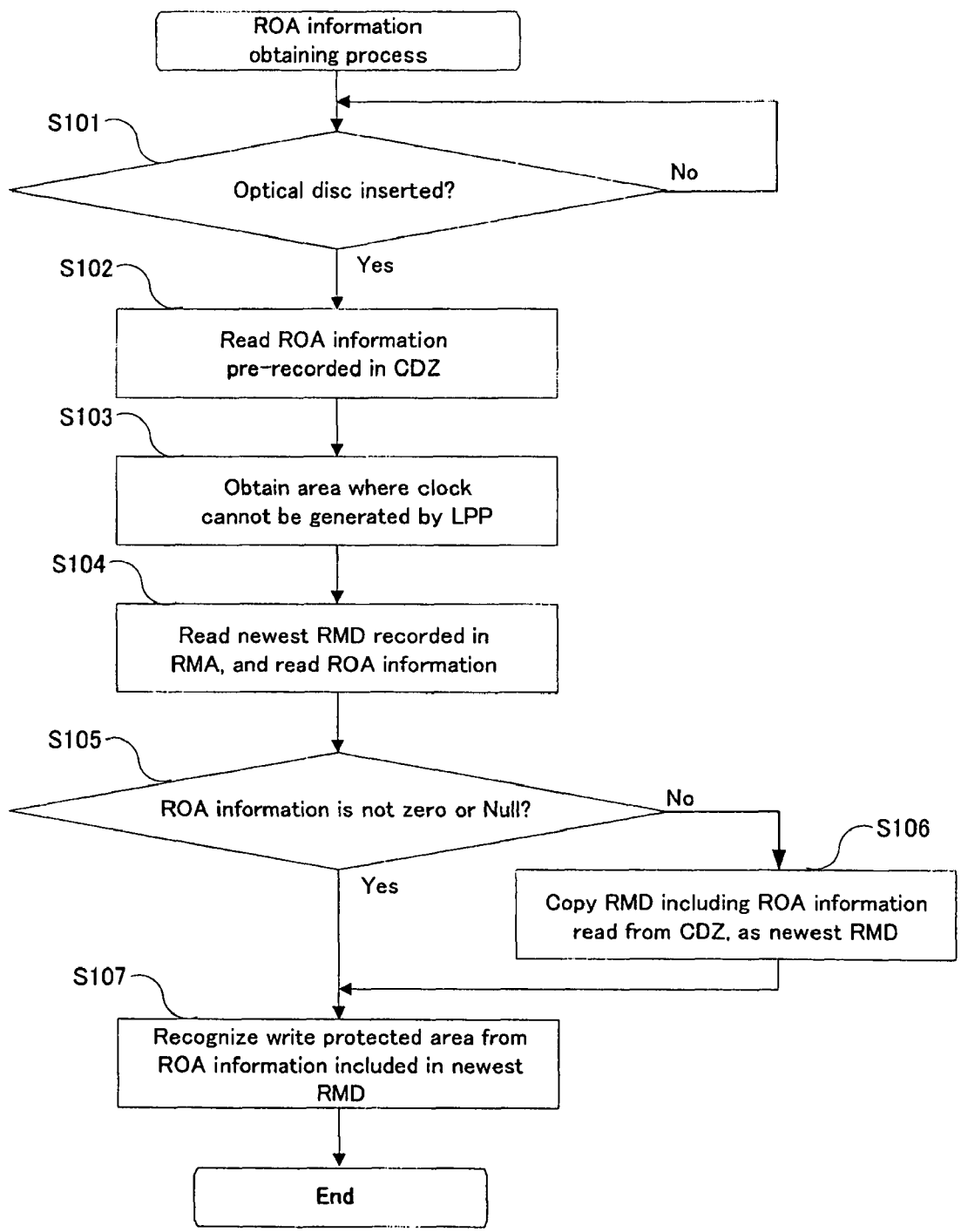

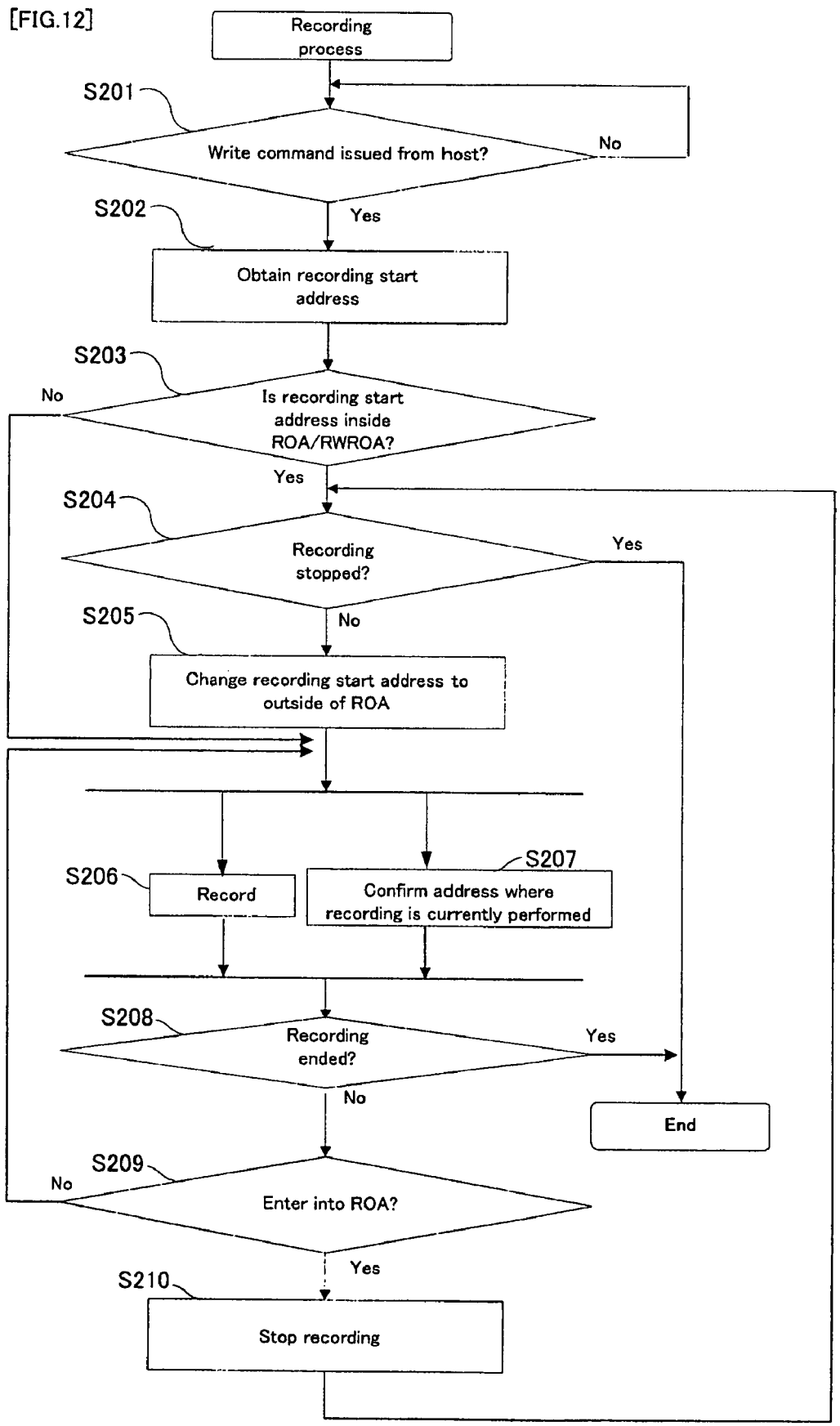
[FIG.12]

[FIG.13]
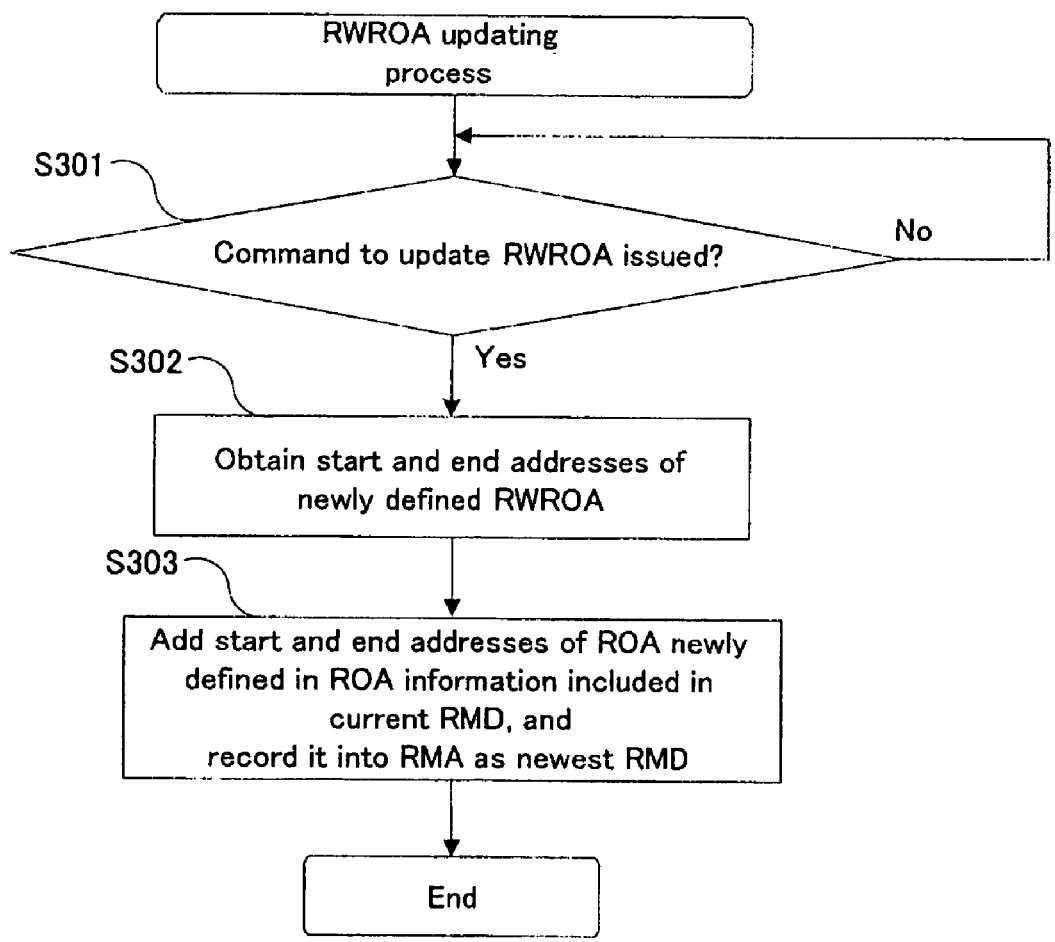

[FIG.14]

(a) 20a: ROA information (in RMA)

| Data position | Content | Data amount (Bytes) |
|---|---|---|
| 0~3 | Start address of ROA/RWROA1 | 4 |
| 4~7 | End address of ROA/RWROA1 | 4 |
| 8~11 | Start address of ROA/RWROA2 | 4 |
| 12~15 | End address of ROA/RWROA2 | 4 |
| 16~19 | Start address of ROA/RWROA3 | 4 |
| 20~23 | End address of ROA/RWROA3 | 4 |
| 24~27 | Start address of ROA/RWROA4 | 4 |
| 28~31 | End address of ROA/RWROA4 | 4 |
| : | : | : |
| 2040~2043 | Start address of ROA/RWROA308 | 4 |
| 2044~2047 | End address of ROA/RWROA308 | 4 |

(b) 20a: ROA information (in RMA)

Corresponding to ROA1
Corresponding to ROA2
Corresponding to RWROA1

| Data position | Content | Data amount (Bytes) |
|---|---|---|
| 0~3 | 00FF 598C h | 4 |
| 4~7 | 00FF 4C97 h | 4 |
| 8~11 | 10FF 4C96 h | 4 |
| 12~15 | 10FF 151B h | 4 |
| 16~19 | 00FE C78A h | 4 |
| 20~23 | 00FE A5F5 h | 4 |
| 24~27 | 0000 0000 h | 4 |
| 28~31 | 0000 0000 h | 4 |
| : | : | : |
| 2040~2043 | 0000 0000 h | 4 |
| 2044~2047 | 0000 0000 h | 4 |

[FIG.15]

20b: Second position information

| Content |
|---|
| Position information |
| Identification information indicating ROA1/RWROA1 |
| Position information |
| Identification information indicating ROA2/RWROA2 |
| ⋮ |
| Position information |
| Identification information indicating ROA「m」/RWROA「n」 |

[FIG.16]

20c: Second position information

| Content | |
|---|---|
| Position information indicating ROA1 | Position information indicating RWROA1 |
| Position information indicating ROA2 | Position information indicating RWROA2 |
| Position information indicating ROA3 | Position information indicating RWROA3 |
| Position information indicating ROA4 | Position information indicating RWROA4 |
| : | : |
| Position information indicating ROA⌈n⌋ | Position information indicating RWROA⌈m⌋ |

[FIG.17]

20d: Second position information

| Content |
|---|
| Position information indicating ROA1 |
| Updating time |
| Enable / disable updating |
| Position information indicating RWROA1 |
| Updating time |
| Enable / disable updating |
| ⋮ |
| Position information indicating ROA⌈m⌋/RWROA⌈n⌋ |
| Updating time |
| Enable / disable updating |

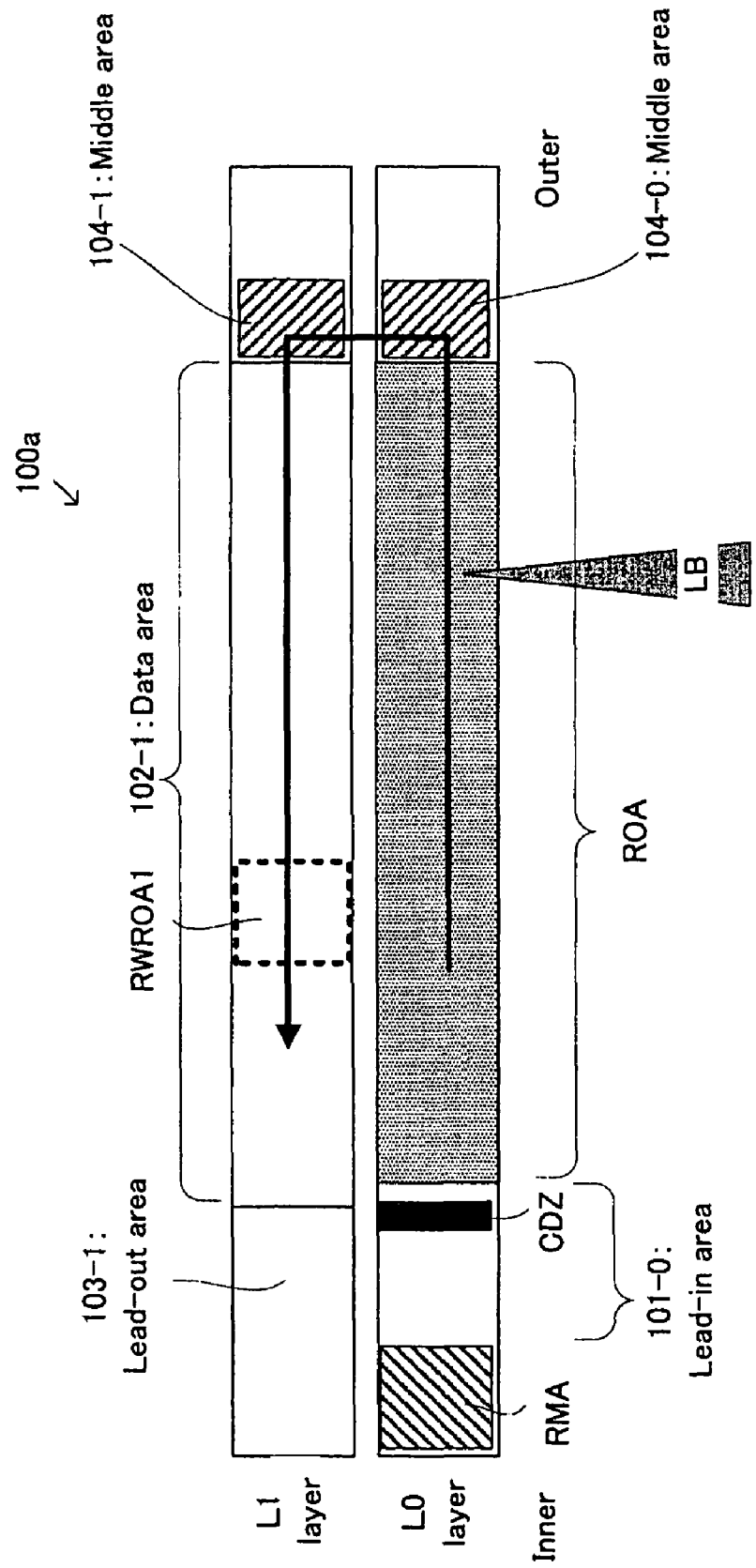
[FIG.18]

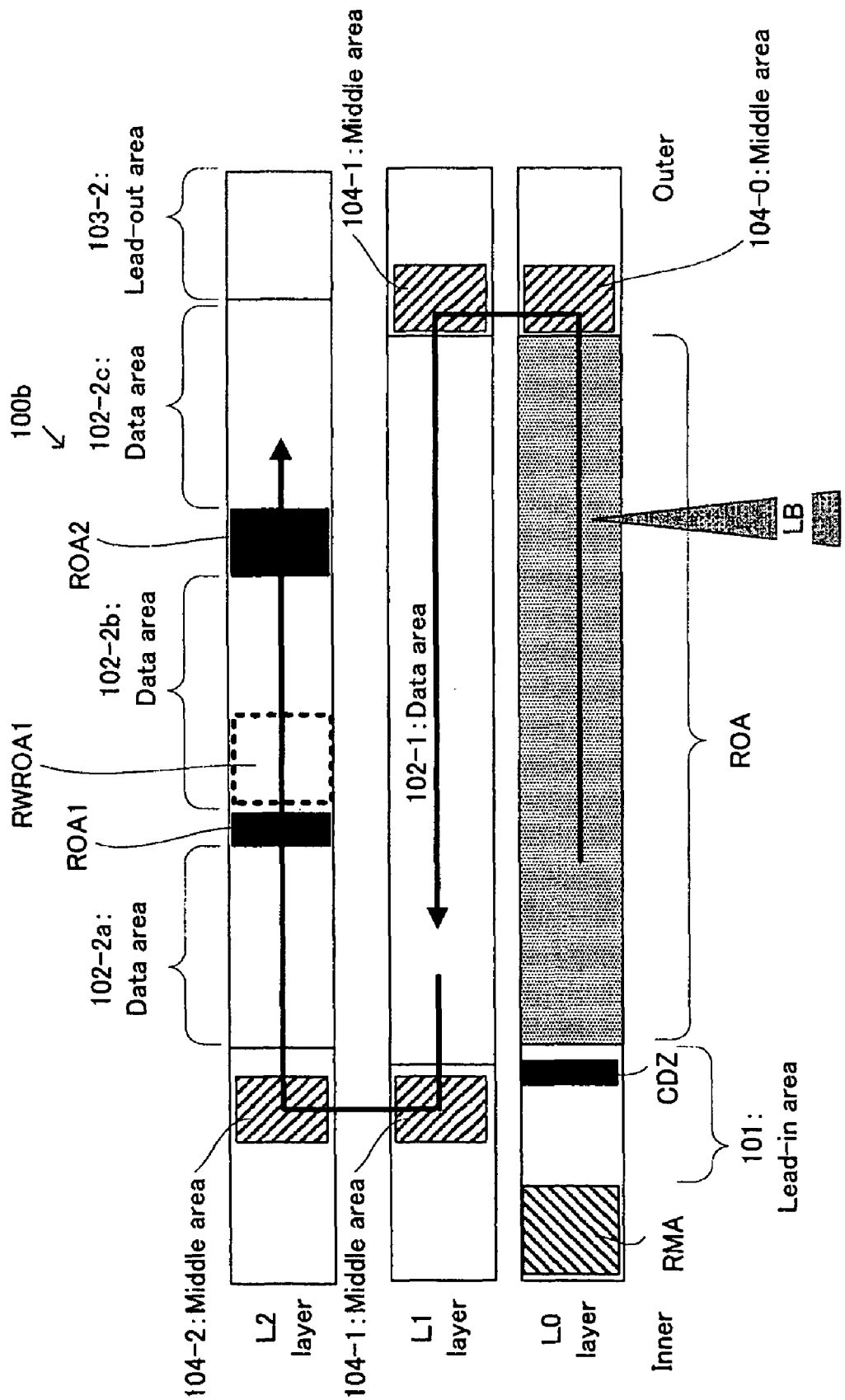
[FIG.19]

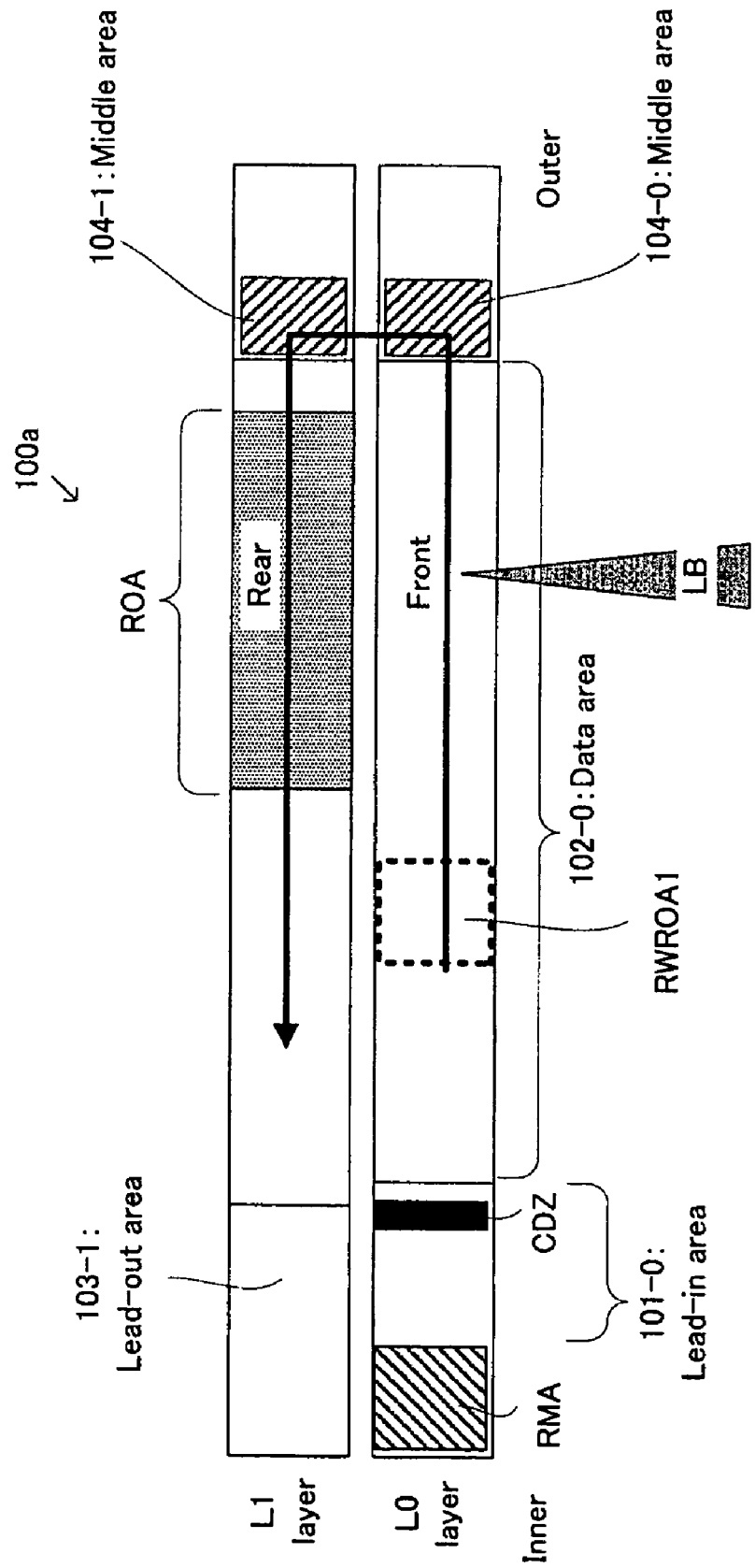
[FIG.20]

INFORMATION RECORDING MEDIUM, INFORMATION RECORDING APPARATUS AND METHOD, AND INFORMATION REPRODUCING APPARATUS AND METHOD

TECHNICAL FIELD

The present invention relates to an information recording medium, such as an optical disc, like a DVD (Digital Versatile Disc), a BD (Blu-ray Disc), a CD (Compact Disc) or the like, on which recoding and reproduction can be performed by irradiating it with laser light, a recording apparatus and a recording method for the information recording medium, a reproducing apparatus and a reproducing method, a recording/reproducing apparatus and a recording/reproducing method, and a computer program.

BACKGROUND ART

There is proposed a hybrid type optical disc having two types of physical features. This hybrid type optical disc has: (i) a recording area holding the physical feature which allows additional or postscript recording and rewriting of record information and which is substantially the same as that of a recording type optical disc, such as a CD-R, a DVD-R, or a DVD-RW or the like; and (ii) a read only area or reproduce only area holding substantially the same physical feature as that of a read only type optical disc, such a CD-ROM and a DVD-ROM. There is also proposed a hybrid type optical disc with the read only area on the inner circumferential side of a recording layer and with the recording area on the outer circumferential side.

On the other hand, copyright protection for the record information, such as movie contents, and ensuring confidentiality are generally realized by an encryption system based on encryption information, such as an encryption key. Specifically, in this encryption system, the encryption information is recorded in advance together with the record information, or obtained from the exterior, such as a network.

In a patent document 1 or the like, a controlling method is described in which in order to prevent incorrect recording, such as writing into the read only area, address information indicating the position of the read only area is recorded in advance on the information recording medium, and the writing into the read only area is protected or disabled on the basis of the address information.

In a patent document 2 or the like, a method is described in which the address information indicating the position of the read only area is recorded in advance on the information recording medium by forming embossed pits, and it is used as control information for setting disable writing into the read only area.

Patent document 1: Japanese Patent Application Laid Open NO. 2003-59194

Patent document 2: Japanese Patent Application Laid Open NO.

DISCLOSURE OF INVENTION

Subject to be Solved by the Invention

However, in the above-mentioned hybrid type optical disc, the premise is that a write protected area (i.e. a read only area in a rewritable area) or the read only area is fixed in position, for example, and it is possible only to prevent the incorrect writing into the read only area or the like whose position is fixed. Namely, there is such a technical problem that it is possible only to statically manage the position of the write protected area or the read only area on the optical disc.

It is therefore an object of the present invention to provide an information recording medium, an information recording apparatus, an information recording method, an information reproducing apparatus, an information reproducing method, an information recording/reproducing apparatus, and an information recording/reproducing method, which enable the record information to be properly recorded or reproduced or the like on a hybrid type information recording medium, for example, and a computer program which makes a computer function as the information recording apparatus, the information reproducing apparatus, and the information recording/reproducing apparatus.

Means for Solving the Subject (Information Recording Medium)

Hereinafter, the information recording medium of the present invention will be explained.

The above object of the present invention can be achieved by an information recording medium provided with: a read only area in which read-only information is recorded in advance by formation of embossed pits; a data area in which record information can be recorded; a first management area (CDZ) in which first position information (Read Only Area information: ROA information) about a position of the read only area is recorded in advance by formation of embossed pits; and a second management area (RMA) in which, in addition to or instead of (i) the first position information, (ii) second position information (Read Only Area information: ROA information) about a position of a write protected area in which writing of one portion or all of the record information provided for the data area is disabled, can be recorded.

According to the information recording medium of the present invention, in the read only area of a hybrid type optical disc, for example, the read-only information, such as movie contents, for example, is recorded in advance by formation of embossed pits in a method of injection mold or the like. Then, in the first management area (CDZ), the first position information about the position of the read only area is recorded in advance by formation of embossed pits.

In addition, in the data area of the hybrid type optical disc, for example, the record information, such as user data, is rewritably recorded. Particularly, the data area can have (i) the write protected area in which writing of one portion or all of the record information is disabled, and (ii) a rewritable area in which writing of one portion or all of the record information is enabled.

Particularly in the present invention, there is provided the second management area (RMA) in which, in addition to or instead of (i) the first position information about the position of the read only area, (ii) second position information about the position of the write protected area can be recorded.

As a result, it is possible to prevent incorrect writing into the read only area whose position is fixed, on the basis of the first position information, and it is possible to prevent incorrect writing into the write protected area whose position is variable, for example, on the basis of the second position information. Namely, it is possible to statically manage the position of the read only area on the information recording medium, and it is possible to dynamically manage the position of the write protected area on the information recording medium.

In addition, more basic and highly versatile information with little or no change in itself is recorded in advance in the read only area by formation of embossed pits, as the read-only information. In the same manner, the first position information about the position of the read only area is recorded in advance in the first management area by formation of embossed pits. On the other hand, more applicable and highly scalable information with a large change in itself can be recorded into the write protected area within the data area. In the same manner, the second position information about the position of the write protected area can be recorded into the second management area. As a result, it is possible to realize more proper and advanced information management, by recording and protecting various information in a proper recording area, on the basis of the nature and characteristics of the information itself.

In one aspect of the information recording medium of the present invention, land pre-pits (LPP) are not formed in advance in at least one of the read only area and the first management area.

According to this aspect, it is possible to prevent the incorrect writing into the read only area whose position is fixed, on the basis of that the pre-pits are not formed in advance.

In another aspect of the information recording medium of the present invention, a synchronization signal is recorded in advance in at least one of the read only area and the first management area.

According to this aspect, it is possible to generate a recording clock in advance, by using an information recording apparatus or the like described later, on the basis of the synchronization signal recorded in advance.

In another aspect of the information recording medium of the present invention, in the first management area, (i) a start address indicating a start position of the read only area and (ii-1) an end address indicating an end position of the read only area or (ii-2) a recording capacity of the read only area are recorded in advance, as the first position information, and in the second management area, in addition to (iii) the first position information, (iv) a start address indicating a start position of the write protected area and (v-1) an end address indicating an end position of the write protected area or (v-2) a recording capacity of the write protected area can be recorded, as the second position information.

According to this aspect, it is possible to manage the position of the read only area on the information recording medium, statically and more highly accurately, on the basis of the start address and the end address (or recording capacity of the read only area) indicating the position of the read only area. At the same time, it is possible to manage the position of the write protected area on the information recording medium, dynamically and more highly accurately, on the basis of the start address and the end address (or recording capacity of the write protected area) indicating the position of the write protected area.

In another aspect of the information recording medium of the present invention, in the second management area, (i) a start address indicating a start position of the read only area or the write protected area, (ii) an end address indicating an end position of the read only area or the write protected area, and (iii) identification information indicating whether the start address and the end address correspond to the read only area or the write protected area, can be recorded as the first or second position information.

According to this aspect, on the basis of the start address, the end address, and the identification information, it is possible to manage the position of the read only area on the information recording medium, statically, with an information amount saved, and more highly accurately, and at the same time, it is possible to manage the position of the write protected area on the information recording medium, dynamically, with an information amount saved, and more highly accurately.

In another aspect of the information recording medium of the present invention, the second management area has (i) one field to record therein the first position information and (ii) another field to record therein the second position information.

According to this aspect, on the basis of the first position information recorded in the one field and the second position information recorded in the another field, it is possible to manage the position of the read only area on the information recording medium, statically and more highly accurately, and at the same time, it is possible to manage the position of the write protected area on the information recording medium, dynamically and more highly accurately. In addition, it is possible to realize an improvement in processing speed by the information recording apparatus, for example, with respect to the first and second position information.

In another aspect of the information recording medium of the present invention, in the second management area, (i) a start address indicating a start position of the read only area or the write protected area, (ii) an end address indicating an end position of the read only area or the write protected area, (iii) time information about a time point that at least the second position information is recorded, and (iv) enable/disable information about enable/disable writing of the second position information, can be recorded as the first or second position information.

According to this aspect, on the basis of the start address, the end address, the time information, and the enable/disable information, it is possible to manage the position of the read only area on the information recording medium, statically and more highly accurately, and at the same time, it is possible to manage the position of the write protected area on the information recording medium, dynamically and more highly accurately.

In another aspect of the information recording medium of the present invention, management information (RMD) including the second position information can be recorded in the second management area.

According to this aspect, on the basis of the management information including the second position information, it is possible to manage the position of the write protected area on the information recording medium, dynamically and more highly accurately.

In another aspect of the information recording medium of the present invention, a plurality of read only areas are discontinuously disposed in a form of dividing the data area.

According to this aspect, on the basis of the read-only information and the record information, it is possible to realize a more highly applicable application.

In another aspect of the information recording medium of the present invention, the information recording medium is provided with a plurality of recording layers, each for recording a plurality of information, and at least one of the plurality of recording layers is provided with at least one of the read only area, the data area, the first management area, and the second management area.

According to this aspect, in a multilayer type optical disc, it is possible to statically manage the position of the read only area on the information recording medium and at the same time, it is possible to dynamically manage the position of the write protected area on the information recording medium.

In this aspect, a predetermined area of at least one of the plurality of recording layers may be provided with the read only area.

By virtue of such construction, there is no read only area formed with embossed pits in the front layer viewed from a laser light irradiation side, so that it is possible to further simplify and perform the optimum recording power control without influence of a difference in light transmittance caused by a difference of the groove area or the embossed area in the recording layer located in the front.

Moreover, in this aspect, the one recording layer may be a recording layer located on a rear side viewed from a laser light incident side.

Namely, in the recordable area of the recording layer located on the rear side viewed from the laser light irradiation side, the recording can be performed without via the read only area formed with embossed pits, so that it is possible to almost or completely eliminate optimum recording power control.

In general, as compared to the recorded state or unrecorded state of the groove track, the read only area formed with embossed pits has lower light transmittance with respect to the recording layer located on the rear side viewed from the laser light irradiation side. Thus, the optimum recording power in the recording via the read only area is larger than the power in the recording via the groove portion. Therefore, if there are many read only areas and recordable areas in the front layer, it is complex to control the optimum recording power, performed in accordance with the areas of the front layer, in the case where the recording is performed in the rear layer.

Thus, the read only area may be disposed as one block, in the recording layer located in the front out of the plurality of recording layers, as viewed from the laser light irradiation side. As a result, the read only area in the front layer is specified in a certain radial position or address, so that it is only necessary to change the optimum recording power when the recording is performed into the rear layer in that position (or the certain radial position or address), which simplifies the optimum recording power control.

Moreover, the read only area may be disposed in the entire recording layer located in the front out of the plurality of recording layers, as viewed from the laser light irradiation side. As a result, the front layer is just the read only area, so that it is only necessary to perform the recording into the rear layer with the optimum recording in the recording via the read only area, which can eliminate the optimum recording power control according to the areas in the front layer.

In another aspect of the information recording medium of the present invention, the record information includes content data, the read-only information includes one portion of reproduction control information (e.g. a car navigation program, encryption information) for controlling reproduction of the content data, and the write protected area includes another portion (upgraded version) of the reproduction control information.

According to this aspect, one portion of the reproduction control information, such as a car navigation program and encryption information, for controlling reproduction of the record information, such as the content data, is recorded in advance in the read only area by formation of embossed pits, for example, as the read-only information. On the other hand, another portion of the reproduction control information can be recorded into the write protected area whose position can be specified on the basis of the second position information. Incidentally, another portion of the first generation reproduction control information may be generated by reproducing one portion of the reproduction control information.

As a result, it is possible to temporarily set disable writing of another portion of the reproduction control information, for example, which is expected to be updated frequently, out of the reproduction control information. If another portion of the reproduction control information is newly updated after a lapse of predetermined time, it is possible to newly set disable writing of another portion of the reproduction control information newly updated, on the basis of the second position information newly updated, properly responding to a change in information amount.

(Information Recording Apparatus)

Hereinafter, the information recording apparatus of the present invention will be explained.

The above object of the present invention can be also achieved by an information recording apparatus for recording record information onto an information recording medium provided with: a read only area in which read-only information is recorded in advance by formation of embossed pits; a data area in which the record information can be recorded; a first management area (CDZ) in which first position information (Read Only Area information: ROA information) about a position of the read only area is recorded in advance by formation of embossed pits; and a second management area (RMA) in which, in addition to or instead of (i) the first position information, (ii) second position information (Read Only Area information: ROA information) about a position of a write protected area in which writing of one portion or all of the record information provided for the data area is disabled, can be recorded, the information recording apparatus provided with: an obtaining device for obtaining the first position information (ROA information) and the second position information (ROA information); a recording device for recording the record information; and a controlling device for controlling the recording device to record the record information on the basis of the first position information and the second position information obtained.

According to the information recording apparatus of the present invention, firstly, by the obtaining device, such as an optical pickup, for example, the first position information (ROA information) and the second position information (ROA information) are obtained. Then, under the control of the controlling device, such as a CPU (Central Processing Unit) of a drive or a host, for example, the record information is recorded by the recording device, such as an optical pickup, on the basis of the obtained first and second position information.

Particularly in the present invention, the record information is recorded on the basis of (ii) the second position information about the position of the write protected area in which writing of one portion or all of the record information provided for the data area is disabled, in addition to or instead of (i) the first position information.

As a result, it is possible to prevent the incorrect writing into the read only area whose position is fixed, on the basis of the first position information, and it is possible to prevent the incorrect writing into the write protected area whose position is variable, for example, on the basis of the second position information. Namely, by using the information recording apparatus, it is possible to statically manage the position of the read only area on the information recording medium, and it is possible to dynamically manage the position of the write protected area on the information recording medium.

Incidentally, in response to the various aspects owned by the above-mentioned information recording medium of the present invention, the information recording apparatus of the present invention can adopt various aspects.

In one aspect of the information recording apparatus of the present invention, the information recording apparatus is further provided with an updating device for updating the second position information on the basis of a change in position of the write protected area.

According to this aspect, on the basis of the second position information updated by the updating device, it is possible to manage the position of the write protected area on the information recording medium, dynamically and more highly accurately.

In another aspect of the information recording apparatus of the present invention, the second management area provided for the information recording medium can hold another second position information of at least one generation ago, and the controlling device control the recording device to record the record information on the basis of the another second position information, in addition to the first position information and the second position information obtained.

According to this aspect, it is possible to realize reuse of the record information recorded in the write protected area on the information recording medium, on the basis of another second position information of at least one generation ago, in addition to the first position information and the second position information obtained. More specifically, even if a place which is the write protected area in the another second position information of at least one generation ago, is not set to the write protected area in the newest second position information, it is also possible not to overwrite the record information. Therefore, even if the record information in the newest write protected area, such as an upgrade program, for example, is inappropriate, it is possible to restore the record information in the write protected area of one generation ago.
(Information Reproducing Apparatus)

Hereinafter the information reproducing apparatus of the present invention will be explained.

The above object of the present invention can be also achieved by an information reproducing apparatus for reproducing record information on an information recording medium provided with: a read only area in which read-only information is recorded in advance by formation of embossed pits; a data area in which the record information can be recorded; a first management area (CDZ) in which first position information (Read Only Area information: ROA information) about a position of the read only area is recorded in advance by formation of embossed pits; and a second management area (RMA) in which, in addition to or instead of (i) the first position information, (ii) second position information (Read Only Area information: ROA information) about a position of a write protected area in which writing of one portion or all of the record information provided for the data area is disabled, can be recorded, the information reproducing apparatus provided with: an obtaining device for obtaining the first position information (ROA information) and the second position information (ROA information); a reproducing device for reproducing the record information; and a controlling device for controlling the reproducing device to reproduce the record information on the basis of the first position information and the second position information obtained.

According to the information reproducing apparatus of the present invention, firstly, by the obtaining device, such as an optical pickup, for example, the first position information (ROA information) and the second position information (ROA information) are obtained. Then, under the control of the controlling device, such as a CPU (Central Processing Unit) of a drive or a host, for example, the record information is reproduced by the reproducing device, such as an optical pickup, on the basis of the obtained first and second position information.

Particularly in the present invention, the record information is reproduced on the basis of (ii) the second position information about the position of the write protected area in which writing of one portion or all of the record information provided for the data area is disabled, in addition to or instead of (i) the first position information.

As a result, by using an information recording/reproducing apparatus, it is possible to statically manage the position of the read only area on the information recording medium, and it is possible to dynamically manage the position of the write protected area on the information recording medium.

Incidentally, in response to the various aspects owned by the above-mentioned information recording medium of the present invention, the information reproducing apparatus of the present invention can adopt various aspects.
(Information Recording Method)

Hereinafter, the information recording method of the present invention will be explained.

The above object of the present invention can be also achieved by an information recording method on an information recording apparatus provided with a recording device for recording record information onto an information recording medium provided with: a read only area in which read-only information is recorded in advance by formation of embossed pits; a data area in which the record information can be recorded; a first management area (CDZ) in which first position information (Read Only Area information: ROA information) about a position of the read only area is recorded in advance by formation of embossed pits; and a second management area (RMA) in which, in addition to or instead of (i) the first position information, (ii) second position information (Read Only Area information: ROA information) about a position of a write protected area in which writing of one portion or all of the record information provided for the data area is disabled, can be recorded, the information recording method provided with: an obtaining process of obtaining the first position information (ROA information) and the second position information (ROA information); and a controlling process of controlling the recording device to record the record information on the basis of the first position information and the second position information obtained.

According to the information recording method of the present invention, it is possible to receive the various benefits owned by the information recording apparatus of the present invention.

Incidentally, in response to the various aspects owned by the above-mentioned information recording apparatus of the present invention, the information recording method of the present invention can adopt various aspects.
(Information Reproducing Method)

Hereinafter, the information reproducing method of the present invention will be explained.

The above object of the present invention can be also achieved by an information reproducing method on an information reproducing apparatus provided with a reproducing device for reproducing record information on an information recording medium provided with: a read only area in which read-only information is recorded in advance by formation of embossed pits; a data area in which the record information can be recorded; a first management area (CDZ) in which first position information (Read Only Area information: ROA information) about a position of the read only area is recorded in advance by formation of embossed pits; and a second management area (RMA) in which, in addition to or instead of (i) the first position information, (ii) second position information (Read Only Area information: ROA information) about a position of a write protected area in which writing of one portion or all of the record information provided for the data area is disabled, can be recorded, the information reproducing method provided with: an obtaining process of obtaining the first position information (ROA information) and the second position information (ROA information); and a controlling process of controlling the reproducing device to reproduce the record information on the basis of the first position information and the second position information obtained.

According to the information reproducing method of the present invention, it is possible to receive the various benefits owned by the information reproducing apparatus of the present invention.

Incidentally, in response to the various aspects owned by the above-mentioned information reproducing apparatus of the present invention, the information reproducing method of the present invention can adopt various aspects.

(Computer Program)

Hereinafter, the computer program of the present invention will be explained.

The above object of the present invention can be also achieved by a computer program for record control to control a computer provided for the above-mentioned information recording apparatus of the present invention (including its various aspects), the computer program making the computer function as at least one portion of the obtaining device, the recording device, and the controlling device.

The above object of the present invention can be also achieved by a computer program for reproduction control to control a computer provided for the above-mentioned information reproducing apparatus of the present invention (including its various aspects), the computer program making the computer function as at least one portion of the obtaining device, the reproducing device, and the controlling device.

According to each of the computer programs of the present invention, the above-mentioned information recording apparatus or information reproducing apparatus of the present invention can be embodied relatively readily, by loading the computer program from a recording medium for storing the computer program, such as a ROM, a CD-ROM, a DVD-ROM, a hard disk or the like, into the computer, or by downloading the computer program, which may be a carrier wave, into the computer via a communication device.

Incidentally, in response to the various aspects owned by the above-mentioned information recording apparatus or information reproducing apparatus of the present invention, each of the computer programs of the present invention can adopt various aspects.

The above object of the present invention can be also achieved by a first computer program product in a computer-readable medium for tangibly embodying a program of instructions executable by a computer provided in the aforementioned information recording apparatus of the present invention (including its various aspects), to make the computer function as at least one portion of the obtaining device, the recording device, and the controlling device.

The above object of the present invention can be also achieved by a second computer program product in a computer-readable medium for tangibly embodying a program of instructions executable by a computer provided in the aforementioned information reproducing apparatus of the present invention (including its various aspects), to make the computer function as at least one portion of the obtaining device, the reproducing device, and the controlling device.

According to the first or second computer program product of the present invention, the aforementioned information recording apparatus or information reproducing apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned information recording apparatus or information reproducing apparatus of the present invention.

These effects and other advantages of the present invention will become more apparent from the embodiments explained below.

As explained above, according to the information recording medium of the present invention, it is provided with: the read only area; the data area; the first management area; and the second management area. As a result, it is possible to prevent the incorrect writing into the read only area whose position is fixed, on the basis of the first position information, and it is possible to prevent the incorrect writing into the write protected area whose position is variable, for example, on the basis of the second position information. Namely, it is possible to statically manage the position of the read only area on the information recording medium, and it is possible to dynamically manage the position of the write protected area on the information recording medium.

Moreover, according to the information recording apparatus of the present invention, it is provided with: the obtaining device; the recording device; and the controlling device, and according to the information recording method of the present invention, it is provided with: the obtaining process; and the controlling process. As a result, it is possible to prevent the incorrect writing into the read only area whose position is fixed, on the basis of the first position information, and it is possible to prevent the incorrect writing into the write protected area whose position is variable, for example, on the basis of the second position information. Namely, by using the information recording apparatus, it is possible to statically manage the position of the read only area on the information recording medium, and it is possible to dynamically manage the position of the write protected area on the information recording medium.

Moreover, according to the information reproducing apparatus of the present invention, it is provided with: the obtaining device; the reproducing device; and the controlling device, and according to the information reproducing method of the present invention, it is provided with: the obtaining process; and the controlling process. As a result, by using the information recording/reproducing apparatus, it is possible to statically manage the position of the read only area on the information recording medium, and it is possible to dynamically manage the position of the write protected area on the information recording medium.

Furthermore, according to the computer program of the present invention, it makes a computer function as the above-mentioned information recording apparatus or the information reproducing apparatus. Thus, it is possible to statically manage the position of the read only area on the information recording medium, and it is possible to dynamically manage the position of the write protected area on the information recording medium.

BRIEF DESCRIPTION OF DRAWINGS

FIG. 1 is a substantial plan view showing the basic structure of an optical disc having a plurality of recording areas in an embodiment of the information recording medium of the present invention, in association with a conceptual view showing a recording area structure in the radial direction.

FIG. 2 is a conceptual graph showing a relationship between each of the recording areas of the optical disc in the embodiment of the information recording medium of the present invention and an address capable of specifying the position of the recording area.

FIG. 3 is a schematic plan view showing one specific example of the recording areas of the optical disc in the embodiment of the information recording medium of the present invention.

FIG. 4 are a table showing one specific example of the first position information of the present invention (FIG. 4(a)) and a table showing one specific example of the data structure of the ROA information associated with the first position information of the present invention (FIG. 4(b)).

FIG. 5 are a table showing one specific example of the second position information of the present invention (FIG. 5(a)) and a table showing one specific example of the data structure of the ROA information associated with the second position information of the present invention (FIG. 5(b)).

FIG. 6 are schematic plan views showing one specific example of four transitions in the recording areas of the optical disc in the embodiment of the information recording medium of the present invention.

FIG. 7 is a table showing one specific example of the data structure of the ROA information associated with the first position information of the present invention, in association with FIG. 6.

FIG. 8 is a table showing one specific example of the data structure of the ROA information associated with the second position information of the present invention, in association with FIG. 6.

FIG. 9 is a block diagram showing the basic structures of an information recording/reproducing apparatus in an embodiment of the information recording apparatus of the present invention and a host computer.

FIG. 10 is a flowchart showing an entire process including (i) an obtaining process of obtaining the ROA (Read Only Area) information, (ii) a recording process, and (iii) an updating process of updating a write protected area RWROA, performed by the information recording/reproducing apparatus in the embodiment of the information recording apparatus of the present invention.

FIG. 11 is a flowchart showing (i) the obtaining process of obtaining the ROA information performed by the information recording/reproducing apparatus in the embodiment of the information recording apparatus of the present invention.

FIG. 12 is a flowchart showing (ii) the recording process performed by the information recording/reproducing apparatus in the embodiment of the information recording apparatus of the present invention.

FIG. 13 is a flowchart showing (iii) the updating process of updating a write protected area RWROA performed by the information recording/reproducing apparatus in the embodiment of the information recording apparatus of the present invention.

FIG. 14 are tables showing another specific example of the second position information.

FIG. 15 is a table showing another specific example of the second position information.

FIG. 16 is a table showing another specific example of the second position information.

FIG. 17 is a table showing another specific example of the second position information.

FIG. 18 is a conceptual view schematically showing the structure of the recording areas in the radial direction of an optical disc in another embodiment of the information recording medium of the present invention.

FIG. 19 is a conceptual view schematically showing the structure of the recording areas in the radial direction of an optical disc in another embodiment of the information recording medium of the present invention.

FIG. 20 is a conceptual view schematically showing the structure of the recording areas in the radial direction of an optical disc in another embodiment of the information recording medium of the present invention.

DESCRIPTION OF REFERENCE CODES

1 . . . center hole, 50 . . . track, 51 . . . ECC block, 100 . . . optical disc, 101 . . . lead-in area, 102 . . . data area, 103 . . . lead-out area, 104 . . . middle area, 300 . . . information recording/reproducing apparatus, 301 . . . optical pickup, 302 . . . signal recording/reproducing device, 303 . . . address detector, 305 . . . CPU (drive control device), 306 . . . spindle motor, 307 (402). . . memory, 308 (406). . . data input/output control device, 309 (407). . . bus, 400 . . . host computer, 401 . . . CPU (for host), 403 . . . operation control device, 404 . . . operation button, 405 . . . display panel, CDZ . . . control data zone, RMA . . . recording management area, ROA . . . read only area, RWROA . . . write protected area, LB . . . laser light

BEST MODE FOR CARRYING OUT THE INVENTION

Hereinafter, the best mode for carrying out the present invention will be discussed in order for each embodiment, with reference to the drawings.

(1) EMBODIMENT OF INFORMATION RECORDING MEDIUM

Next, with reference to FIG. 1 to FIG. 8, an embodiment of the information recording medium of the present invention will be explained in detail.

(1-1) Basic Structure

Firstly, with reference to FIG. 1, the basic structure of an optical disc in the embodiment of the information recording medium of the present invention will be explained. FIG. 1 is a substantial plan view showing the basic structure of the optical disc having a plurality of recording areas in the embodiment of the information recording medium of the present invention, in association with a conceptual view showing a recording area structure in the radial direction.

As shown in FIG. 1, an optical disc 100 has a recording surface on the disc main body with a diameter of about 12 cm, as is a DVD. On the recording surface, the optical disc 100 is provided with: a center hole 1 as the center; a lead-in area 101; a data area 102; and a lead-out area 103, which are associated with the embodiment. Then, at least one recording layer is laminated or stacked on a not-illustrated transparent substrate, for example, of the optical disc 100. In each recording area of the recording layer, a track or tracks 50, such as a groove track and a land track, are alternately placed, spirally or concentrically, centered on the center hole 1. On the track 50, record information (data) is divided and recorded by a unit of ECC block 51. The ECC (Error Correction Code) block 51 is a management unit for the record information in which the record information is error correctable.

In particular, the optical disc in the embodiment is a hybrid type optical disc having a recording area where various information can be rewritten, such as a data area, and a recording area where various information cannot be rewritten, such as a control data zone CDZ, a read only area ROA 1, and a ROA 2.

Incidentally, the present invention is not particularly limited to the optical disc having the three areas as described above. For example, even if the lead-in area 101 or the lead-out area 103 does not exist, a data structure explained below can be constructed. Moreover, as described later, the lead-in area 101 or the lead-out area 103 may be further segmentized.

(1-2) Detailed Structure

Next, with reference to FIG. 2 to FIG. 8, the detailed structure of the optical disc in the embodiment of the information recording medium of the present invention will be explained.

(1-2-1) Address Capable of Specifying the Position of the Recording Area on the Optical Disc Firstly, with reference to FIG. 2 and FIG. 3, a relationship between each of the recording areas of the optical disc and an address capable of specifying the position of the recording area will be explained. FIG. 2 is a conceptual graph showing the relationship between each of the recording areas of the optical disc in the embodiment of the information recording medium of the present invention and the address capable of specifying the position of the recording area. FIG. 3 is a schematic plan view showing one specific example of the recording areas of the optical disc in the embodiment of the information recording medium of the present invention. Incidentally, the vertical axis in FIG. 2 indicates the value of the address, such as a sector number and a land pre-pit address, and the horizontal axis indicates a relative position in the radial direction of the optical disc. Moreover, one specific example of the "address" of the present invention is constructed from a physical sector number (sector number) constituting the ECC block, and a land pre-pit address.

As shown in FIG. 2 and FIG. 3, the recording areas of the optical disc 100 in the embodiment of the information recording medium of the present invention are provided with: (i-1) a recording management area RMA, which is one specific example of the "second management area" of the present invention; (i-2) a lead-in area 101 having a control data zone CDZ which is one specific example of the "first management area" of the present invention; (ii) a data area 102a; (iii) a read only area ROA 1; (iv) a data area 102b having a write protected area (i.e. a read only area in a rewritable area) RWROA 1; (v) a read only area ROA 2; (vi) a data area 102c; and (vii) a lead-out area 103, from the inner to the outer circumferential side. Incidentally, in the second management area, various management information may be recorded, in addition to second position information described later. The management information herein is various types of information for managing the information recording medium, such as (i) information about recording features, such as an optimum recording power, (ii) attribute information for specifying the type of the medium; and (iii) information for specifying the positions of the various types of recording areas.

Moreover, as shown in FIG. 2, if the above-mentioned address capable of uniquely specifying the position of the recording area of the optical disc is the land pre-pit address, for example, as an optical pickup of an information recording/reproducing apparatus described later is displaced from the inner to the outer circumferential side, the address of the recording area of the optical disc may be reduced (refer to a thick solid line in FIG. 2). Alternatively, if the above-mentioned address capable of uniquely specifying the position of the recording area of the optical disc is the physical sector number (sector number) constituting the ECC block, for example, as the optical pickup is displaced from the inner to the outer circumferential side, the address of the recording area of the optical disc may be increased (refer to a thin dotted line in FIG. 2).

(1-2-2) First Position Information and Second Position Information

Next, with reference to FIG. 4 and FIG. 5, one specific example of the first position information and the second position information of the present invention will be explained. FIG. 4 are a table showing one specific example of the first position information of the present invention (FIG. 4(a)) and a table showing one specific example of the data structure of the ROA information associated with the first position information of the present invention (FIG. 4(b)). FIG. 5 are a table showing one specific example of the second position information of the present invention (FIG. 5(a)) and a table showing one specific example of the data structure of the ROA information associated with the second position information of the present invention (FIG. 5(b)).

As shown in FIG. 4(a), first position information 10 of the present invention may include a plurality of position information, each of which corresponds to respective one of a plurality of read only areas, in order to specify and manage the position of each of the plurality of read only areas ROA 1 to ROA "n" (wherein n is a natural number). Namely, the first position information 10 may include position information for specifying and managing the position of the read only area ROA 1 in the first place, position information for specifying and managing the position of the read only area ROA 2 in the second place, and so on, and position information for specifying and managing the position of the read only area ROA "n" in the n-th place. Incidentally, the first position information 10 may be recorded in advance by forming embossed pits in the control data zone CDZ (hereinafter referred to as a "CDZ", as occasion demands).

Specifically, as shown in FIG. 4(b), ROA information 10a, which is one specific example of the "first position information", may include the start address of the read only area ROA 1 in data positions of 0 to 3 and the end address of the read only area ROA 1 in data positions of 4 to 7, wherein the data positions can be designated with numbers of 0 to 2047 allocated by a byte unit, for example. In the same manner, the ROA information 10a may include the start address of the read only area ROA 2 in data positions of 8 to 11 and the end address of the read only area ROA 2 in data positions of 12 to 15, and so on. At the end, the ROA information 10a may include the start address of the read only area ROA 256 in data positions of 2040 to 2043 and the end address of the read only area ROA 256 in data positions of 2044 to 2047. Incidentally, it is constructed such that each of the information indicating the start address and the information indicating the end address has a data amount of 4 bytes, for example; however, it is obvious that another data amount will do. Moreover, it is constructed such that the data positions can be designated with the numbers allocated by the byte unit; however, the data positions may be designated on the basis of a unit of another information amount.

On the other hand, as shown in FIG. 5(a), second position information 20 of the present invention may include a plurality of position information, each of which corresponds to respective one of a plurality of read only areas and a plurality of write protected areas, in order to specify and manage the position of each of the plurality of read only areas ROA 1 to ROA "m" (wherein m is a natural number) and in order to specify and manage the position of each of the plurality of write protected areas RWROA 1 and RWROA 2 or the like. Namely, the second position information 20 may include position information for specifying and managing the position of the read only area ROA 1 in the first place, position information for specifying and managing the position of the write protected area RWROA 1 in the second place, position information for specifying and managing the position of the read only area ROA 2 in the third place, and so on, and position information for specifying and managing the position of the read only area ROA "m" in the m-th place. Incidentally, the second position information 20 may be able to be recorded directly in a recording management area RMA (hereinafter referred to as a "RMA", as occasion demands). Alternatively, the second position information 20 may be included in recording management data RMD (hereinafter referred to as a "RMD", as occasion demands), and may be able to be indirectly recorded via the RMD.

Specifically, as shown in FIG. 5(b), substantially in the same manner as the ROA information 10a, ROA information 20a, which is one specific example of the second position information, may include the start address of the read only area ROA 1 in data positions of 0 to 3 and the end address of the read only area ROA 1 in data positions of 4 to 7. In the same manner, the ROA information 20a may include the start address of the write protected area RWROA 1 in data positions of 8 to 11, the end address of the write protected area RWROA 1 in data positions of 12 to 15, the start address of the read only area ROA 2 in data positions of 16 to 19, the end address of the read only area ROA 2 in data positions of 20 to 23, and so on. At the end, the ROA information 20a may include the start address of the read only area ROA 254 in data positions of 2040 to 2043 and the end address of the read only area ROA 254 in data positions of 2044 to 2047. Incidentally, substantially in the same manner as the ROA information 10a, it is obvious that another data amount will do, except for the data amount of 4 bytes. Moreover, the data positions can be designated on the basis of a unit of another information amount other than the byte unit.

(1-2-3) One Specific Example of Transition of Read Only Area and Write Protected Area Next, with reference to FIG. 6 to FIG. 8, one specific example of the transition of the read only area and the write protected area will be explained. FIG. 6 are schematic plan views showing one specific example of four transitions in the recording areas of the optical disc in the embodiment of the information recording medium of the present invention. FIG. 7 is a table showing one specific example of the data structure of the ROA information associated with the first position information of the present invention, in association with FIG. 6. FIG. 8 is a table showing one specific example of the data structure of the ROA information associated with the second position information of the present invention, in association with FIG. 6.

Firstly, as shown in FIG. 6(a), for example, when the optical disc is shipped, the record information, such as user data, is not recorded yet in the data area. In this condition, the ROA information 10a is recorded in advance in the CDZ, by a disc manufacturer, for example. Specifically, as shown in FIG. 7, the ROA information 10a includes the start address "00FF 598C h" (h indicates representation by hexadecimal numbers) of the read only area ROA 1 in data positions of 0 to 3, and the end address "00FF 4C97 h" of the read only area ROA 1 in data positions of 4 to 7. In addition, it includes the start address "00FE C78A h" of the read only area ROA 2 in data positions of 8 to 11, and the end address "00FE A5F5 h" of the read only area ROA 2 in data positions of 12 to 15. Incidentally, "0000 0000 h" is still substituted in the rest of the data positions.

Then, as shown in a donut-shape area hatched by right diagonal lines, the record information is recorded from (i) the outermost circumferential edge of the RMA to (ii) the recording area located on the inner circumferential side from the read only area ROA 2 by a predetermined amount, out of the reading areas included in the data area 102, by an information recording/reproducing apparatus, for example.

Then, if it is desired to prevent the incorrect writing by defining the record information recorded in an area between inner concentric circle and outer concentric circle, respectively written in dashed line, as the write protected area RWROA 1, by using an information reproducing apparatus, for example, the ROA information 20a is generated and recorded into the RMA, as shown in FIG. 8. Specifically, as shown in FIG. 8, in substantially the same manner as the ROA information 10a, the ROA information 20a includes the start address "00FF 598C h" (h indicates representation by hexadecimal numbers) of the read only area ROA 1 in data positions of 0 to 3, and the end address "00FF 4C97 h" of the read only area ROA 1 in data positions of 4 to 7. In particular, the ROA information 20a includes the start address "00FF 4C96 h" of the write protected area RWROA 1 in data positions of 8 to 11, and the end address "00FF 151B h" of the write protected area RWROA 1 in data positions of 12 to 15. In addition, it includes the start address "00FE C78A h" of the read only area ROA 2, included in the above-mentioned ROA information 10a, in data positions of 16 to 19, and the end address "00FE A5F5 h" of the read only area ROA 2 in data positions of 20 to 23. Incidentally, "0000 0000 h" is still substituted in the rest of the data positions.

Therefore, as shown in FIG. 6(d), an information recording/reproducing apparatus can almost or completely prevent the incorrect writing even into the write protected area RWROA 1, as well as the CDZ and the read only areas ROA 1 and ROA 2, on the basis of the ROA information 20a.

(2) EMBODIMENT OF INFORMATION RECORDING APPARATUS

Next, with reference to FIG. 9 to FIG. 13, the structure and the operation of an embodiment of the information recording apparatus of the present invention will be explained in detail. In particular, the embodiment is an example in which the information recording apparatus of the present invention is applied to an information recording/reproducing apparatus for an optical disc.

(2-1) Basic Structure

Firstly, with reference to FIG. 9, an explanation will be given for the basic structures of an information recording/reproducing apparatus 300 in the embodiment of the information recording apparatus of the present invention and a host computer 400. FIG. 9 is a block diagram showing the basic structures of the information recording/reproducing apparatus in the embodiment of the information recording apparatus of the present invention and the host computer. Incidentally, the information recording/reproducing apparatus 300 has a function of recording record data onto the optical disc 100 and a function of reproducing the record data recorded on the optical disc 100.

With reference to FIG. 9, the inner structure of the information recording/reproducing apparatus 300 will be explained. The information recording/reproducing apparatus 300 is an apparatus for recording information onto the optical disc 100 and reading the information recorded on the optical disc 100, under the control of a CPU (Central Processing Unit) 305 for drive.

The information recording/reproducing apparatus 300 is provided with: the optical disc 100; an optical pickup 301; a signal recording/reproducing device 302; an address detector 303; an address operator 304; the CPU (drive control device) 305; a spindle motor 306; a memory 307; a data input/output control device 308; and a bus 309.

Moreover, the host computer 400 is provided with: a CPU (host control device) 401; a memory 402; an operation control device 403; an operation button 404; a display panel 405; a data input/output control device 406; and a bus 407.

In particular, the information recording/reproducing apparatus 300 may be constructed to be capable of communicating with an external network, by housing the host computer 400 provided with a communication device, such as a modem, for example, in the same package. Alternatively, the information recording/reproducing apparatus 300 may be constructed to be capable of communicating with an external network, by that the CPU (host control device) 401 of the host computer 400 directly controls the information recording/reproducing apparatus 300 via the data input/output control device 308 and the bus 309.

The optical pickup 301 performs the recording/reproduction with respect to the optical disc 100 and is provided with: a semiconductor laser apparatus; and a lens. More specifically, the optical pickup 301 irradiates the optical disc 100 with a light beam, such as a laser beam, as reading light with a first power upon reproduction, and as writing light with a second power upon recording, with it modulated.

The signal recording/reproducing device 302 performs the recording/reproduction with respect to the optical disc 100 by controlling the optical pickup 301 and the spindle motor 306. More specifically, the signal recording/reproducing device 302 is provided with a laser diode (LD) driver, a head amplifier, and the like, The LD driver drives the not-illustrated semiconductor laser built in the optical pickup 352. The head amplifier amplifies the output signal of the optical pickup 352, i.e., the reflected light of the light beam, and outputs the amplified signal. More specifically, the signal recording/reproducing device 302 drives the not-illustrated semiconductor laser built in the optical pickup 352 so as to determine an optimum laser power by a process of recording and reproducing an OPC pattern, together with a not-illustrated timing generator, under the control of the CPU 305, at the time of OPC (Optimum Power Control) process. In particular, the signal recording/reproducing device 302 constitutes one example of the "recording device", the "reproducing device", the "recording/reproducing device" of the present invention, with the optical pickup 301. Moreover, the signal recording/reproducing device 302 may be capable of (i) obtaining the ROA information 10a pre-recorded in the control data zone CDZ, for example, and (ii) obtaining the ROA information 20a recorded in the recording management area RMA, for example. Thus, the signal recording/reproducing device 302 may constitute one example of the "obtaining device" of the present invention.

The address detector 303 detects the address (address information) on the optical disc 100, from a reproduction signal including a pre-format address signal or the like, outputted by the signal recording/reproducing device 302.

The CPU (drive control device) 305 controls the entire information recording/reproducing apparatus 300 by giving instructions to various control devices through the bus 309. In particular, the CPU 305 can almost or completely prevent the incorrect writing even into the write protected area RWROA 1, as well as the CDZ and the read only areas ROA 1 and ROA 2, on the basis of the ROA information 10a or 20a obtained by the signal recording/reproducing device 302. Moreover, software or firmware for operating the CPU 305 is stored in the memory 307. In particular, the CPU 305 is one example of the "controlling device" of the present invention.

The spindle motor 306 is intended to rotate and stop the optical disc 100, and operates in accessing the optical disc 100. More specifically, the spindle motor 306 is constructed to rotate and stop the optical disc 100 at a predetermined speed under spindle servo by a not-illustrated servo unit or the like.

The memory 307 is used in the general data processing and the OPC processing on the information recording/reproducing apparatus 300, including a buffer area for the record/reproduction data, an area used as an intermediate buffer when data is converted into the data that can be used on the signal recording/reproducing device 302, and the like. Moreover, the memory 307 is provided with: a ROM area into which a program for performing an operation as a recording device, i.e. firmware, is stored; a buffer for temporarily storing the record/reproduction data; a Random Access Memory (RAM) area into which a parameter required for the operation of the firmware program or the like is stored; and the like.

The data input/output control device 308 controls the data input/output from the outside with respect to the information recording/reproducing apparatus 300, and performs storage and export with respect to the data buffer on the memory 307. A drive control command, which is issued from the external host computer 400 (hereinafter referred to as a "host", as occasion demands) connected to the disc drive 301 via an interface, such as a SCSI (Small Computer System Interface) and an ATAPI (AT Attachment Packet Interface), is transmitted to the CPU 305 through the data input/output control device 308. Moreover, the record/reproduction data is also exchanged with the host computer 400 through the data input/output control device 308 in the same manner.

The CPU (host control device) 401, the memory 402, the data input/output control device 406, and the bus 407 of the host computer 400 are substantially the same as the corresponding constituent elements in the information recording/reproducing apparatus 300.

The operation control device 403 performs the reception of an operation instruction and display with respect to the host computer 400. The operation control device 403 sends an instruction of recording or reproduction by using the operation bottom 404, for example, to the CPU 401. The CPU 401 sends a control command to the information recording/reproducing apparatus 300 through the input/output control device 402, on the basis of the instruction information from the operation control device 403, to thereby control the entire information recording/reproducing apparatus 300. In the same manner, the CPU 401 can send a command of requiring the information recording/reproducing apparatus 300 to send the operation condition to the host, to the information recording/reproducing apparatus 300. By this, it is possible to recognize the operation condition of the information recording/reproducing apparatus 300, such as during recording and during reproduction. Thus, the CPU 401 can output the operation condition of the information recording/reproducing apparatus 300, to the display panel 405, such as a fluorescent tube and a LCD, through the operation control device 403.

One specific example used by combining the information recording/reproducing apparatus 300 and the host computer 400, as explained above, is household equipment, such as recorder equipment for recording/reproducing video images. The recorder equipment records a video signal from a broadcast reception tuner and an external connection terminal, onto a disc, and outputs the video signal reproduced from the disc, to external display equipment, such as a television. The operation as the recorder equipment is performed by executing a program stored in the memory 402, on the CPU 401. Moreover, in another specific example, the information recording/reproducing apparatus 300 is a disc drive (hereinafter referred to as a drive, as occasion demands), and the host computer 400 is a personal computer or a workstation. The host computer 400, such as the personal computer, and the drive are connected to each other through the data input/output control device 308 (406), such as the SCSI and the ATAPI. An application, such as writing software, which is installed in the host computer, controls the disc drive.

(2-2) Operation Principle

Next, with reference to FIG. 7 to FIG. 9 described above, as occasion demands, in addition to FIG. 10 to FIG. 13, an explanation will be given for the operation principle of the information recording/reproducing apparatus 300 in the embodiment of the information recording apparatus of the presetn invention. FIG. 10 is a flowchart showing an entire process including (i) an obtaining process of obtaining the ROA (Read Only Area) information, (ii) a recording process, and (iii) an updating process of updating a write protected area RWROA, performed by the information recording/reproducing apparatus in the embodiment of the information recording apparatus of the present invention. FIG. 11 is a flowchart showing (i) the obtaining process of obtaining the ROA information performed by the information recording/reproducing apparatus in the embodiment of the information recording apparatus of the present invention. FIG. 12 is a flowchart showing (ii) the recording process performed by the information recording/reproducing apparatus in the embodiment of the information recording apparatus of the present invention. FIG. 13 is a flowchart showing (iii) the updating process of updating a write protected area RWROA performed by the information recording/reproducing apparatus in the embodiment of the information recording apparatus of the present invention.

(2-2-1) Entire Process

As shown in FIG. 10, in the entire process of the information recording/reproducing apparatus, (i) the ROA information obtaining process (step S100), (ii) the recording process (step S200), and (iii) the write protected area RWROA updating process (step S300) are performed substantially at the same time, or in tandem.

(2-2-2) ROA (Read Only Area) Information Obtaining Process

As shown in FIG. 11, in the ROA information obtaining process, firstly, under the control of the CPU (drive control device) 305, it is judged whether or not the optical disc is inserted (step S101). If the optical disc is inserted (the step S101: Yes), the ROA information 10$a$ recorded in advance in the CDZ is read, under the control of the CPU 305 (step S102).

Then, under the control of the CPU 305, the start address and the end address are obtained in the recording area where a clock for recording or reproduction cannot be generated, by pre-format land pre-pits (pre-format LPP) (step S103). In particular, it may be constructed such that a clock signal is generated from a reproduction signal obtained from the reproduction of the record information recorded in the recording area, on the basis of the start address and the end address of the recording area where the clock for recording or reproduction cannot be generated, obtained in the above manner, and that the recording area where the recording or reproduction can be started can be known, on the basis of the land pre-pit, under the control of the CPU 305.

Then, under the control of the CPU 305, the newest RMD (Recording Management Data) recorded in the RMA is reproduced, and the ROA information 20$a$ is read (step S104).

Then, under the control of the CPU 305, it is judged whether or not the read ROA information 20$a$ is not zero or null, and the start address or the end address in the read only area or the write protected area is recorded therein (step S105). If the read ROA information 20$a$ is not zero or null, and the start address or the end address in the read only area or the write protected area is recorded therein (the step S105: Yes), the start address or the end address indicating the position of the write protected area RWROA 1 is recognized, from the ROA information 20$a$ included in the newest RMD, under the control of the CPU 305 (step S107).

On the other hand, as a result of the judgment in the step S105, if the read ROA information 20$a$ is zero or null, and the start address or the end address in the read only area or the write protected area is not recorded therein (the step S105: No), the RMD including the ROA information 10$a$ read from the CDZ is recorded into the RMA as the newest RMD, under the control of the CPU 305 (step S106). Moreover, on the other hand, as a result of the judgment in the step S101, if the optical disc is not inserted (the step S101: No), it is judged again whether or not the optical disc is inserted (the step S101).

(2-2-3) Recording Process

As shown in FIG. 12, in the recording process, firstly, it is judged whether or not a write command, for example, to start the recording process is issued from the host computer under the control of the CPU 305 (step S201). If the write command to start the recording process is issued (the step S201: Yes), an address at which the recording is started in the recording area (hereinafter a "recording start address"), for example, is obtained, under the control of the CPU 305 (step S202).

Then, under the control of the CPU 305, it is judged whether or not the obtained recording start address is inside the read only area ROA or the write protected area RWROA, on the basis of the ROA information 20$a$ (step S203). If the obtained recording start address is inside the read only area ROA or the write protected area RWROA (the step S203: Yes), then, under the control of the CPU 305, it is judged whether or not the recording is stopped (step S204). If the recording is not stopped (the step S204: No), the recording start address is changed to the outside of the read only area ROA or the write protected area RWROA (step S205).

Then, under the control of the CPU 305, the record information is recorded from the recording start address, for example (step S206).

Then, under the control of the CPU 305, the address at which the record information is recorded, is confirmed in real time, for example (step S207). Simultaneously or in tandem, under the control of the CPU 305, it is judged whether or not the recording of the record information is ended (step S208). If the recording of the record information is not ended (the step S208: No), it is judged whether or not a position where the record information is recorded enters into the inside of the read only area ROA or the write protected area RWROA, under the control of the CPU 305 (step S209). In particular, it may be judged whether or not a position where the record information is scheduled to be recorded enters into the inside of the read only area ROA or the write protected area RWROA, on the basis of (i) the information amount of the record information scheduled to be recorded and (ii) the recording start address, under the control of the CPU 305, simultaneously or in tandem with the obtainment of the recording start address in the above-mentioned step S202, for example. If the position where the record information is recorded enters into the inside of the read only area ROA or the write protected area RWROA (the step S209: Yes), the recording is stopped under the control of the CPU 305 (step S210). Then, it may be judged whether or not the recording is stopped under the control of the CPU 305, as described above (the step S204).

On the other hand, as a result of the judgment in the step S209, if the position where the record information is recorded does not enters into the inside of the read only area ROA or the write protected area RWROA (the step S209: No), the recording of the record information is continued, under the control of the CPU 305, as described above (the step S206). In the same manner, as a result of the judgment in the step S203, if the obtained recording start address is not inside the read only area ROA or the write protected area RWROA (the step S203: No), the recording of the record information is continued, under the control of the CPU 305, as described above (the step S206).

Moreover, on the other hand, as a result of the judgment in the step S204, if the recording is stopped (the step S204; Yes), or if the recording of the record information is ended (the step S208: Yes), a series of recording process is ended.

(2-2-4) Write Protected Area Updating Process

As shown in FIG. 13, in the write protected area RWROA updating process, firstly, under the control of the CPU 305, it is judged whether or not a command to update the write protected area RWROA is issued from the host computer, for example (step S301). In particular, the CPU 305 may perform this judgment by itself, in predetermined timing or in response to a predetermined event.

Then, under the control of the CPU 305, the start address and the end address of the write protected area RWROA newly defined are obtained (step S302).

Then, the start address and the end address indicating the position of the write protected area RWROA newly defined are added to the ROA information 20a included in the newest RMD, and recorded into the RMA as the newest RMD (step S303). Specifically, as shown in FIG. 7 and FIG. 8 described above, the start address "00FF 4C96 h" of the write protected area RWROA 1 and the end address "00FF 151B h" thereof are added to the ROA information 20a, and the RMD including this ROA information 20a is recorded into the RMA as the newest RMD.

Incidentally, the above-mentioned write protected area updating process may be performed on a storage device, such as a memory, for example, of the information recording/reproducing apparatus, and may be recorded into the RMA when the optical disc is ejected, for example. Alternatively, the recording for updating the ROA information 20a may be performed directly on the RMA of the optical disc at each time of the updating.

(3) OTHER SPECIFIC EXAMPLES OF SECOND POSITION INFORMATION

Next, with reference to FIG. 14 to FIG. 17, other specific examples of the second position information of the present invention will be explained. FIG. 14 are tables showing another specific example of the second position information. FIG. 15 is a table showing another specific example of the second position information. FIG. 16 is a table showing another specific example of the second position information. FIG. 17 is a table showing another specific example of the second position information.

(3-1) Another Example of the Second Position Information Part 1

As shown in FIG. 14(*a*), the most significant data position or the most upper data position (most significant byte) of the value of the address, such as the start address and the end address, of the ROA information 20a may be used to distinguish between the read only area ROA and the write protected area RWROA (which may mean the Re-Writable area including the Read Only Area). For example, if the recording area is the ROA, the most significant byte of the start address of the recording area may be set to "00". For example, if the recording area is the RWROA, the most significant byte of the start address of the recording area may be set to "10".

More specifically, as shown in FIG. 14(*b*), in the ROA information 20a, the "value of data positions of 0 to 3 (or 0 to 3 bytes)" indicating the start address of the ROA 1 may indicate "00FF 598C h", and the "value of data positions of 4 to 7 (or 4 to 7 bytes)" indicating the end address of the ROA 1 may indicate "00FF 4C97 h". On the other hand, the "value of data positions of 8 to 11 bytes" indicating the start address of the RWROA 1 may indicate "10FF 4C96 h", and the "value of data positions of 12 to 15 bytes" indicating the end address of the RWROA 1 may indicate "10FF 151B h". As a result, it may be constructed such that it is possible to distinguish between the read only area "ROA" and the write protected area "RWROA" by identifying or distinguishing the most significant data position (most significant byte) is "00" or "10".

(3-2) Another Example of the Second Position Information Part 2

As shown in FIG. 15, second position information 20b of the present invention may include the following two types of information, in order to specify and manage the position of each of the plurality of read only areas ROA 1 to ROA "m" (wherein m is a natural number) and in order to specify and manage the position of each of a plurality of write protected areas RWROA 1 to RWROA n (wherein n is a natural number) or the like. Namely, the second position information 20b may include (i) a plurality of position information, each of which corresponds to respective one of the plurality of read only areas and the plurality of write protected areas, and (ii) identification information indicating that the position information corresponds to either the read only area or the write protected area. More specifically, the second position information 20b includes position information for specifying and managing the position of one read only area or write protected area in the first place, and identification information indicating that the first placed position information corresponds to either the read only area or the write protected area, in the second place. The second position information 20b includes position information for specifying and managing the position of another read only area or write protected area in the third place, and identification information indicating that the position information in the third place corresponds to either the read only area or the write protected area, in the fourth place, and so on. The second position information 20b includes position information for specifying and managing the position of another read only area ROA "m" or write protected area "n" in the (2m+2n−1)-th place, and identification information indicating that the (2m+2n−1)-th placed position information corresponds to either the read only area "m" or the write protected area "n", in the (2m+2n)-th place.

According to the second position information 20b, it is possible to identify whether the position information corresponds to the read only area or the write protected area, by using the identification information with a small information amount, such as an information amount of 1 bit, for example. Thus, it is possible to realize a reduction in the information amount of the second position information 20b. Incidentally, the specific data structure of the second position information 20b may be properly determined on the basis of the type of the identification information, such as a flag, with a small information amount, the data amount of the address information, or the like, included in the second position information 20b.

(3-3) Another Example of the Second Position Information Part 3

As shown in FIG. 16, second position information 20c of the present invention may include the following two types of information, in order to specify and manage the position of each of the plurality of read only areas ROA 1 to ROA "m" (wherein m is a natural number) and in order to specify and manage the position of each of a plurality of write protected areas RWROA 1 to RWROA n (wherein n is a natural number) or the like. Namely, the second position information 20c may include (i) one field for a plurality of position information, each of which corresponds to respective one of the plurality of read only areas, and (ii) the other field for a plurality of position information, each of which corresponds to respective one of the plurality of 6 write protected areas. More specifically, one field of the second position information 20c may include position information of the read only area ROA 1 in the first place, position information of the read only area ROA 2 in the second place, and so on, and position information of the read only area ROA "n" in the n-th place. On the other hand, the other field of the second position information 20c may include position information of the write protected area RWROA 1 in the first place, position information of the write protected area RWROA 2 in the second place, and so on, and position information of the write protected area RWROA "m" in the m-th place.

According to the second position information 20c, it is only necessary to refer to the necessary field in accordance with the purpose. In other words, by virtue of one field, it is possible to recognize the position information corresponding to the read only area, whereas by virtue of the other field, it is possible to recognize the position information corresponding to the write protected area. Thus, it is possible to realize an improvement in the processing speed of the second position information 20c, by the information recording/reproducing apparatus, for example. Incidentally, the specific data structure of the second position information 20c may be properly determined on the basis of the information amount of various types of information included in the second position information 20c, for example.

(3-4) Another Example of the Second Position Information Part 4

As shown in FIG. 17, second position information 20d of the present invention may include the following three types of information, in order to specify and manage the position of each of the plurality of read only areas ROA 1 to ROA "m" (wherein m is a natural number) and in order to specify and manage the position of each of a plurality of write protected areas RWROA 1 to RWROA n (wherein n is a natural number) or the like. Namely, the second position information 20d may include (i) a plurality of position information, each of which corresponds to respective one of the plurality of read only areas or the plurality of write protected areas, (ii) information about an updating time point of updating the position information, and (iii) information indicating whether or not the updating is succeeded (or information indicating enable/disable updating). More specifically, the second position information 20d includes position information for specifying and managing the position of one read only area ROA 1, for example, in the first place, and an updating time point of updating the first placed position information in the second place, and information indicating whether or not the updating is succeeded in the third place. The second position information 20d includes position information for specifying and managing the position of one write protected area RWROA 1, for example, in the fourth place, and an updating time point of updating the fourth placed position information in the fifth place, and information indicating whether or not the updating is succeeded in the sixth place, and so on. The second position information 20d includes position information for specifying and managing the position of another read only area ROA "m" or write protected area "n" in the (3m+3n−2)-th place, and an updating time point of updating the (3m+3n−2)-th placed position information in the (3m+3n−1)-th place, and information indicating whether or not the updating is succeeded in the (3m+3n)-th place.

Namely, even if the updating of the record information fails, the record information in the write protected area of the past is held on the basis of the record information in the write protected area of the past so that it can be restored to the record information before the updating process. Therefore, by virtue of the construction of the present invention, it is possible to restore it to an original program if version upgrade of a program fails, for example.

According to the second position information 20d, it is possible to distinguish between the read only area ROA and the write protected area, on the basis of the updating time point, for example. Moreover, it is possible to realize generation management considering a time series change in the position of the write protected area, by evacuating a predetermined generation of the second position information 20d into another area, for example, and by distinguishing the predetermined generation of the second position information 20d in addition to the second position information 20d currently obtained by the information recording/reproducing apparatus, for example. Incidentally, the second position information 20d older than the predetermined generation, which is evacuated to another area, may be rewritable (can be deleted, i.e., cannot be restored). Therefore, it is possible to save the recording capacity of the recording area.

Namely, by virtue of the construction of the present invention, it is possible to restore the record information of the past, up to the predetermined generation, i.e. by going back only a predetermined time length (or less).

(4) OTHER EMBODIMENTS OF INFORMATION RECORDING MEDIUM

Next, with reference to FIG. 18 to FIG. 20, other embodiments of the information recording medium of the present invention will be explained. FIG. 18 is a conceptual view schematically showing the structure of the recording areas in the radial direction of an optical disc in another embodiment of the information recording medium of the present invention. FIG. 19 is a conceptual view schematically showing the structure of the recording areas in the radial direction of an optical disc in another embodiment of the information recording medium of the present invention. FIG. 20 is a conceptual view schematically showing the structure of the recording areas in the radial direction of an optical disc in another embodiment of the information recording medium of the present invention.

An optical disc 100a in another example has, as shown in FIG. 18, such a structure that two recording layers, i.e. an L0 layer and an L1 layer, are laminated on a not-illustrated transparent substrate, for example. The L0 layer is provided with: a lead-in area 101-0 including a RMA and a CDZ; a read only area ROA; and a middle area 104-0, from the inner to the outer circumferential side. On the other hand, the L1 layer is provided with: a middle area 104-1; a data area 102-1 including a write protected area RWROA 1; and a lead-out area 103-1, from the outer to the inner circumferential side. Upon reproduction of such a two-layer type (or dual layer type) optical disc 100, recording or reproduction in the L0 layer or the L1 layer is performed, depending on which recording layer has the focus position of laser light, emitted from the lower to the upper side in FIG. 18. Incidentally, with regard to the order of recording or reproduction in an opposite method, firstly, the reproduction may be performed from the inner to the outer circumferential side of the recording layer located on the rear side viewed from a laser light irradiation side, and then performed from the outer to the inner circumferential side of the recording layer located on the front (or closer side) viewed from the laser light irradiation side. Alternatively, it is also possible to adopt a parallel method in which the recording or reproduction order in the L0 layer is the same as that in the L1 layer.

In general, as compared to the recorded state or unrecorded state of the groove track, the read only area formed with embossed pits has lower light transmittance with respect to the recording layer located on the rear side viewed from the laser light irradiation side. Thus, the optimum recording power in the recording via the read only area is larger than the power in the recording via the groove portion. Therefore, if there are many read only areas and recordable areas in the front layer, it is complex to control the optimum recording power, performed in accordance with the areas of the front layer, in the case where the recording is performed in the rear layer.

Thus, the read only area ROA may be disposed as one block, in the recording layer located in the front out of the plurality of recording layers, as viewed from the laser light irradiation side. As a result, the read only area in the front layer is specified in a certain radial position or address, so that it is only necessary to change the optimum recording power when the recording is performed into the rear layer in that position, which simplifies the optimum recording power control.

Moreover, as shown in FIG. 18, the read only area ROA may be disposed in the entire recording layer located in the front out of the plurality of recording layers, as viewed from the laser light irradiation side. As a result, the front layer is just the read only area, so that it is only necessary to perform the recording into the rear layer with the optimum recording in the recording via the read only area, which can eliminate the optimum recording power control according to the areas in the front layer.

In addition, as shown in FIG. 19, there may be provided a plurality of recording layers, such as three layers or more, each of which is to record a plurality of information, and at least one of the plurality of recording layers may be provided with a data area including the write protected area RWROA 1.

Moreover, additionally, as shown in FIG. 20, the read only area ROA may be disposed in one portion (predetermined area) of the recording layer located on the rear side out of the plurality of recording layers, as viewed from the laser light irradiation side. As a result, there is no read only area formed with embossed pits in the front layer viewed from the laser light irradiation side, so that it is possible to further simplify and perform the optimum recording power control without influence of the difference in light transmittance caused by a difference of the groove area or the embossed area in the recording layer located in the front. Namely, in the recordable area of the recording layer located on the rear side viewed from the laser light irradiation side, the recording can be performed without via the read only area formed with embossed pits, so that it is possible to almost or completely eliminate the optimum recording power control.

In the above-mentioned embodiments, the information recording medium, such as the optical disc, is provided with: the read only area; the data area; the first management area; and the second management area. As a result, it is possible to prevent the incorrect writing into the read only area whose position is fixed, on the basis of the first position information, and it is possible to prevent the incorrect writing into the write protected area whose position is variable, for example, on the basis of the second position information. Namely, it is possible to statically manage the position of the read only area on the information recording medium, and it is possible to dynamically manage the position of the write protected area on the information recording medium.

In the above-mentioned embodiments, an explanation was given for a single layer type, two layer type, or three layer type optical disc on which recording or reproduction can be performed by using laser light, such as blue ray, red LD light, and infrared light, as one specific example of the information recording medium. In addition, the present invention can be also applied to a multilayer type (multiple layer type) optical disc provided with four or more recording layers, for example. Moreover, it can be also applied to other various information recording media supporting high-density recording or high transfer rate.

Moreover, in the above-mentioned embodiment, an explanation was given for the information recording/reproducing apparatus compatible with the single layer type optical disc, for example, as one specific example of the information recording apparatus and the information reproducing apparatus. In addition, the present invention can be also applied to an information recording/reproducing apparatus compatible with a multilayer type (multiple layer type) optical disc provided with two or more recording layers, for example. Moreover, it can be also applied to an information recording/reproducing apparatus compatible with other various information recording media supporting high-density recording or high transfer rate.

The present invention is not limited to the above-described embodiment, and various changes may be made, if desired, without departing from the essence or spirit of the invention which can be read from the claims and the entire specification. An information recording medium, an information recording apparatus and method, an information reproducing apparatus and method, and a computer program, all of which involve such changes, are also intended to be within the technical scope of the present invention.

INDUSTRIAL APPLICABILITY

The information recording medium, the information recording apparatus and method, the information reproducing apparatus and method, and the computer program according to the present invention can be applied to an information recording medium, such as a DVD, a BD, and a CD, and can be further applied to an information recording apparatus, an information reproducing apparatus or the like, such as a DVD recorder or player. Moreover, they can be applied to an information recording apparatus, an information reproducing apparatus, or the like, which is mounted on various computer equipment for consumer use or for business use, or which can be connected to various computer equipment.

The invention claimed is:
1. An information recording medium comprising:
    a read only area in which read-only information is recorded in advance by formation of embossed pits;
    a data area in which record information can be recorded;
    a first management area in which first position information about a position of said read only area is recorded in advance by formation of embossed pits; and a second management area in which, in addition to or instead of (i) the first position information, (ii) second position information about a position of a write protected area in which writing of one portion or all of the record information provided for said data area is disabled, can be recorded, wherein land pre-pits (LPP) are not formed in advance in at least one of said read only area and said first management area, wherein in said second management area, (i) a start address indicating a start position of said read only area or said write protected area, (ii) an end address indicating an end position of said read only area or said write protected area, and (iii) identification information indicating whether the start address and the end address correspond to said read only area or said write protected area, can be recorded as the first or second position information, wherein the record information includes content data, the read-only information includes one portion of reproduction control information for controlling reproduction of the content data, and said write protected area includes another portion of the reproduction control information.

2. The information recording medium according to claim 1, wherein a synchronization signal is recorded in advance in at least one of said read only area and said first management area.

3. The information recording medium according to claim 1, wherein in said first management area, (i) a start address indicating a start position of said read only area and (ii-1) an end address indicating an end position of said read only area or (ii-2) a recording capacity of said read only area are recorded in advance, as the first position information, and in said second management area, in addition to (iii) the first position information, (iv) a start address indicating a start position of said write protected area and (v-1) an end address indicating an end position of said write protected area or (v-2) a recording capacity of said write protected area can be recorded, as the second position information.

4. The information recording medium according to claim 1, wherein said second management area has (i) one field to record therein the first position information and (ii) another field to record therein the second position information.

5. The information recording medium according to claim 1, wherein in said second management area, (i) a start address indicating a start position of said read only area or said write protected area, (ii) an end address indicating an end position of said read only area or said write protected area, (iii) time information about a time point that at least the second position information is recorded, and (iv) enable/disable information about enable/disable writing of the second position information, can be recorded as the first or second position information.

6. The information recording medium according to claim 1, wherein management information (RMD) including the second position information can be recorded in the second management area.

7. The information recording medium according to claim 1, wherein a plurality of read only areas are discontinuously disposed in a form of dividing said data area.

8. The information recording medium according to claim 1, wherein said information recording medium comprises a plurality of recording layers, each for recording a plurality of information, and at least one of the plurality of recording layers comprises at least one of said read only area, said data area, said first management area, and said second management area.

9. The information recording medium according to claim 8, wherein a predetermined area of at least one of the plurality of recording layers comprises said read only area.

10. The information recording medium according to claim 9, wherein the one recording layer is a recording layer located on a rear side viewed from a laser light incident side.

11. An information recording apparatus for recording record information onto an information recording medium comprising: a read only area in which read-only information is recorded in advance by formation of embossed pits; a data area in which the record information can be recorded; a first management area in which first position information about a position of said read only area is recorded in advance by formation of embossed pits; and a second management area in which, in addition to or instead of (i) the first position information, (ii) second position information about a position of a write protected area in which writing of one portion or all of the record information provided for said data area is disabled, can be recorded, wherein land pre-pits (LPP) are not formed in advance in at least one of said read only area and said first management area, wherein in said second management area, (i) a start address indicating a start position of said read only area or said write protected area, (ii) an end address indicating an end position of said read only area or said write protected area, and (iii) identification information indicating whether the start address and the end address correspond to said read only area or said write protected area, can be recorded as the first or second position information, wherein the record information includes content data, the read-only information includes one portion of reproduction control information for controlling reproduction of the content data, and said write protected area includes another portion of the reproduction control information, said information recording apparatus comprising:

an obtaining device for obtaining the first position information and the second position information;

a recording device for recording the record information; and a controlling device for controlling said recording device to record the record information on the basis of the first position information and the second position information obtained.

12. The information recording apparatus according to claim 11, further comprising an updating device for updating the second position information on the basis of a change in position of said write protected area.

13. The information recording apparatus according to claim 11, wherein said second management area provided for said information recording medium can hold another second position information of at least one generation ago, and said controlling device control said recording device to record the record information on the basis of the another second position information, in addition to the first position information and the second position information obtained.

14. The information recording apparatus according to claim 11, wherein said controlling device controls said recording device to record the first position information as the second position information if the second position information indicates zero or null.

15. An information reproducing apparatus for reproducing record information on an information recording medium comprising: a read only area in which read-only information is recorded in advance by formation of embossed pits; a data area in which the record information can be recorded; a first management area in which first position information about a position of said read only area is recorded in advance by formation of embossed pits; and a second management area in which, in addition to or instead of (i) the first position information, (ii) second position information about a position of a write protected area in which writing of one portion or all of the record information provided for said data area is disabled, can be recorded, wherein land pre-pits (LPP) are not formed in advance in at least one of said read only area and said first management area, wherein in said second management area, (i) a start address indicating a start position of said read only area or said write protected area, (ii) an end address indicating an end position of said read only area or said write protected area, and (iii) identification information indicating whether the start address and the end address correspond to said read only area or said write protected area, can be recorded as the first or second position information, wherein the record information includes content data, the read-only information includes one portion of reproduction control information for controlling reproduction of the content data, and said write protected area includes another portion of the reproduction control information, said information reproducing apparatus comprising:
an obtaining device for obtaining the first position information and the second position information;
a reproducing device for reproducing the record information; and
a controlling device for controlling said reproducing device to reproduce the record information on the basis of the first position information and the second position information obtained.

16. An information recording method on an information recording apparatus comprising a recording device for recording record information onto an information recording medium comprising: a read only area in which read-only information is recorded in advance by formation of embossed pits; a data area in which the record information can be recorded; a first management area in which first position information about a position of said read only area is recorded in advance by formation of embossed pits; and a second management area in which, in addition to or instead of (i) the first position information, (ii) second position information about a position of a write protected area in which writing of one portion or all of the record information provided for said data area is disabled, can be recorded, wherein land pre-pits (LPP) are not formed in advance in at least one of said read only area and said first management area, wherein in said second management area, (i) a start address indicating a start position of said read only area or said write protected area, (ii) an end address indicating an end position of said read only area or said write protected area, and (iii) identification information indicating whether the start address and the end address correspond to said read only area or said write protected area, can be recorded as the first or second position information, wherein the record information includes content data, the read-only information includes one portion of reproduction control information for controlling reproduction of the content data, and said write protected area includes another portion of the reproduction control information, said information recording method comprising:
an obtaining process of obtaining the first position information and the second position information; and
a controlling process of controlling said recording device to record the record information on the basis of the first position information and the second position information obtained.

17. An information reproducing method on an information reproducing apparatus comprising a reproducing device for reproducing record information on an information recording medium comprising: a read only area in which read-only information is recorded in advance by formation of embossed pits; a data area in which the record information can be recorded; a first management area in which first position information about a position of said read only area is recorded in advance by formation of embossed pits; and a second management area in which, in addition to or instead of (i) the first position information, (ii) second position information about a position of a write protected area in which writing of one portion or all of the record information provided for said data area is disabled, can be recorded, wherein land pre-pits (LPP) are not formed in advance in at least one of said read only area and said first management area, wherein in said second management area, (i) a start address indicating a start position of said read only area or said write protected area, (ii) an end address indicating an end position of said read only area or said write protected area, and (iii) identification information indicating whether the start address and the end address correspond to said read only area or said write protected area, can be recorded as the first or second position information, wherein the record information includes content data, the read-only information includes one portion of reproduction control information for controlling reproduction of the content data, and said write protected area includes another portion of the reproduction control information, said information reproducing method comprising:
an obtaining process of obtaining the first position information and the second position information; and
a controlling process of controlling said reproducing device to reproduce the record information on the basis of the first position information and the second position information obtained.

* * * * *